(12) United States Patent
Kim

(10) Patent No.: US 11,579,760 B2
(45) Date of Patent: Feb. 14, 2023

(54) AUTOMATIC DATA MODEL GENERATION

(71) Applicant: Tableau Software, LLC, Seattle, WA (US)

(72) Inventor: Jun Ho Kim, Sammamish, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/014,882

(22) Filed: Sep. 8, 2020

(65) Prior Publication Data
US 2022/0075512 A1    Mar. 10, 2022

(51) Int. Cl.
*G06F 3/04847*    (2022.01)
*G06F 16/245*    (2019.01)

(52) U.S. Cl.
CPC ........ *G06F 3/04847* (2013.01); *G06F 16/245* (2019.01)

(58) Field of Classification Search
CPC ............................ G06F 3/04847; G06F 16/245
See application file for complete search history.

(56) References Cited

U.S. PATENT DOCUMENTS

| | | | |
|---|---|---|---|
| 7,010,364 B1 | 3/2006 | Singh et al. | |
| 8,099,674 B2 * | 1/2012 | Mackinlay | G06F 16/24578 715/764 |
| 8,589,811 B2 | 11/2013 | Gotz | |
| 8,983,994 B2 * | 3/2015 | Neels | G06F 40/186 707/765 |
| 9,335,911 B1 * | 5/2016 | Elliot | G06F 16/2423 |
| 9,361,320 B1 | 6/2016 | Vijendra et al. | |
| 9,418,105 B2 | 8/2016 | Buchheit et al. | |
| 9,613,086 B1 * | 4/2017 | Sherman | G06F 16/248 |

(Continued)

FOREIGN PATENT DOCUMENTS

| | | | |
|---|---|---|---|
| JP | 2007249354 A | 9/2007 | |
| JP | 2008217480 A | 9/2008 | |

(Continued)

OTHER PUBLICATIONS

Negash, Solomon, "Business intelligence," Communications of the Association for Information Systems, 2004, vol. 13, pp. 177-195.

(Continued)

*Primary Examiner* — Jeremy L Stanley
(74) *Attorney, Agent, or Firm* — John W. Branch; Branch Partners PLLC

(57) ABSTRACT

Embodiments are directed to managing data visualizations. Candidate data fields from a data source may be determined based on a search expression. The candidate data fields may be displayed in the model panel. A working data model may be generated based on a portion of the candidate data fields such that the portion of the candidate data fields may be included in the working data model. Visualizations may be determined based on recommendation models and the working data model such that a portion of the visualizations may be determined based on shared data fields that may be included in the working data model and the visualizations. A working visualization may be determined based on a visualization listed in the display panel and the working data model such that data fields included in the working data model may be associated with the working visualization.

20 Claims, 14 Drawing Sheets

(56) References Cited

U.S. PATENT DOCUMENTS

| | | | |
|---|---|---|---|
| 9,779,147 B1* | 10/2017 | Sherman | G06F 16/248 |
| 10,552,513 B1* | 2/2020 | Harkare | G06F 3/04847 |
| 10,572,544 B1 | 2/2020 | Zhang et al. | |
| 10,572,804 B1 | 2/2020 | Hilley | |
| 10,572,859 B1 | 2/2020 | Evans et al. | |
| 10,572,925 B1 | 2/2020 | Roy Chowdhury et al. | |
| 10,592,525 B1* | 3/2020 | Khante | G06F 16/245 |
| 10,642,723 B1 | 5/2020 | Krishnamoorthy | |
| 10,705,695 B1* | 7/2020 | Porath | G06F 16/248 |
| 10,719,332 B1* | 7/2020 | Dwivedi | G06F 16/245 |
| 10,775,976 B1* | 9/2020 | Abdul-Jawad | G06F 16/9535 |
| 10,929,415 B1* | 2/2021 | Shcherbakov | G06F 16/26 |
| 10,963,347 B1* | 3/2021 | Chen | G06F 11/1446 |
| 11,232,506 B1 | 1/2022 | Zielnicki | |
| 2005/0134589 A1 | 6/2005 | Heer et al. | |
| 2008/0168135 A1 | 7/2008 | Redlich et al. | |
| 2011/0137850 A1 | 6/2011 | Mourey et al. | |
| 2011/0296309 A1 | 12/2011 | Ngan | |
| 2011/0302110 A1* | 12/2011 | Beers | G16B 40/00 706/11 |
| 2012/0229466 A1 | 9/2012 | Richie et al. | |
| 2012/0233182 A1 | 9/2012 | Baudel et al. | |
| 2013/0091465 A1* | 4/2013 | Kikin-Gil | G06F 9/451 715/817 |
| 2013/0103677 A1* | 4/2013 | Chakra | G06F 16/26 707/723 |
| 2013/0204894 A1* | 8/2013 | Faith | G06Q 50/01 707/769 |
| 2014/0019443 A1 | 1/2014 | Golshan | |
| 2014/0032548 A1 | 1/2014 | Gilra et al. | |
| 2014/0059017 A1 | 2/2014 | Chaney et al. | |
| 2014/0074889 A1* | 3/2014 | Neels | G06F 16/248 707/779 |
| 2014/0344008 A1 | 11/2014 | Gammage et al. | |
| 2015/0278214 A1* | 10/2015 | Anand | G06F 16/338 707/748 |
| 2016/0034305 A1 | 2/2016 | Shear et al. | |
| 2016/0092408 A1* | 3/2016 | Lagerblad | G06F 3/04842 715/243 |
| 2016/0103908 A1 | 4/2016 | Fletcher et al. | |
| 2016/0196534 A1 | 7/2016 | Jarrett et al. | |
| 2016/0307210 A1* | 10/2016 | Agarwal | G06F 16/24578 |
| 2016/0307233 A1 | 10/2016 | Pan et al. | |
| 2016/0350950 A1 | 12/2016 | Ritchie et al. | |
| 2016/0357829 A1 | 12/2016 | Fung et al. | |
| 2016/0364770 A1 | 12/2016 | Denton et al. | |
| 2017/0061659 A1* | 3/2017 | Puri | G06T 11/206 |
| 2017/0069118 A1* | 3/2017 | Stewart | G06F 3/04845 |
| 2017/0124617 A1 | 5/2017 | Spoelstra et al. | |
| 2017/0132489 A1 | 5/2017 | Simgi | |
| 2017/0140118 A1* | 5/2017 | Haddad | G16H 40/63 |
| 2017/0154088 A1* | 6/2017 | Sherman | G06F 16/212 |
| 2017/0154089 A1* | 6/2017 | Sherman | G06F 16/26 |
| 2017/0220633 A1 | 8/2017 | Porath et al. | |
| 2017/0308913 A1 | 10/2017 | Chao et al. | |
| 2018/0004363 A1* | 1/2018 | Tompkins | G06F 40/205 |
| 2018/0039399 A1* | 2/2018 | Kaltegaertner | G06F 3/04847 |
| 2018/0121035 A1* | 5/2018 | Filippi | G06F 40/14 |
| 2018/0129369 A1 | 5/2018 | Kim et al. | |
| 2018/0232405 A1 | 8/2018 | Samara et al. | |
| 2018/0267676 A1 | 9/2018 | Glueck et al. | |
| 2018/0343321 A1* | 11/2018 | Chang | G06F 16/283 |
| 2019/0012553 A1 | 1/2019 | Maruchi et al. | |
| 2019/0026681 A1 | 1/2019 | Polli et al. | |
| 2019/0043506 A1 | 2/2019 | Rivkin et al. | |
| 2019/0102425 A1 | 4/2019 | Obeidat | |
| 2019/0108272 A1* | 4/2019 | Talbot | G06F 3/04847 |
| 2019/0129964 A1 | 5/2019 | Corbin, II et al. | |
| 2019/0130512 A1 | 5/2019 | Kuhn | |
| 2019/0179621 A1 | 6/2019 | Salgado et al. | |
| 2019/0188333 A1* | 6/2019 | Williams | G06F 16/9038 |
| 2019/0213608 A1 | 7/2019 | Ouyang et al. | |
| 2019/0355447 A1 | 11/2019 | Barkol et al. | |
| 2020/0012939 A1* | 1/2020 | Hu | G06N 3/04 |
| 2020/0019546 A1* | 1/2020 | Luo | G06F 16/245 |
| 2020/0050636 A1 | 2/2020 | Datla et al. | |
| 2020/0066397 A1 | 2/2020 | Rai et al. | |
| 2020/0104731 A1* | 4/2020 | Oliner | G06F 16/245 |
| 2020/0233559 A1 | 7/2020 | Rueter et al. | |
| 2020/0250562 A1 | 8/2020 | Bly | |
| 2020/0311680 A1 | 10/2020 | Wahl et al. | |
| 2020/0320462 A1 | 10/2020 | Wang et al. | |
| 2020/0372472 A1 | 11/2020 | Kenthapadi et al. | |
| 2020/0403944 A1 | 12/2020 | Joshi et al. | |
| 2021/0011961 A1 | 1/2021 | Guan et al. | |
| 2021/0019338 A1 | 1/2021 | Grampurohit et al. | |
| 2021/0049143 A1 | 2/2021 | Jacinto et al. | |
| 2021/0088418 A1 | 3/2021 | Sato et al. | |
| 2021/0110288 A1* | 4/2021 | Poothiyot | G06N 20/00 |
| 2021/0194783 A1 | 6/2021 | Sinha et al. | |

FOREIGN PATENT DOCUMENTS

| | | |
|---|---|---|
| JP | 2009-534752 A | 9/2009 |
| JP | 2017174176 A | 9/2017 |
| JP | 2021-6991 A | 1/2021 |
| WO | 2014010071 A1 | 1/2014 |
| WO | 2015030214 A1 | 3/2015 |

OTHER PUBLICATIONS

Eckerson, Wayne W., "Performance Dashboards Measuring. Monitoring, and Managing Your Business," Business Book Summaries, 2012, pp. 1-11.

Lizotte-Latendresse, Simon et al., "Implementing self-service business analytics supporting lean manufacturing: A state-of-the-art review," 16th IFAC Symposium—Incom, 2018, pp. 1143-1148.

Gröger, Christoph et al., "The Operational Process Dashboard for Manufacturing," SciVerse ScienceDirect, Procedia CIRP 7, 2013, pp. 205-210.

Yigitbasioglu, Ogan M. et al., "A review of dashboards in performance management: Implications for design and research," International Journal of Accounting information Systems, 2012, vol. 13, pp. 41-59.

Adam, Frédéric et al., "Developing Practical Decision Support Tools Using Dashboards of Information," In Handbook on Decision Support Systems 2. International Handbooks Information System, Springer, Berlin, Heidelberg, 2008, pp. 151-173.

Passlick, Jens et al., "A Self-Service Supporting Business Intelligence and Big Data Analytics Architecture," Proceedings of the 13th International Conference on Wirtschaftsinformatik, 2017, pp. 1126-1140.

Shneiderman, Ben, "The Eyes Have It: A Task by Data Type Taxonomy for Information Visualizations," Proc. Visual Languages, 1996, pp. 1-9.

Alpar, Paul et al., "Self-Service Business Intelligence," Business & Information Systems Engineering, 2016, vol. 58, pp. 151-155.

Kaur, Pawandeep et al., "A Review on Visualization Recommendation Strategies," In Proceedings of the 12th International Joint Conference on Computer Vision, Imaging and Computer Graphics Theory and Applications, 2017, Vol. 3, pp. 266-273.

Hoang, Duong Thi Anh et ai., "Dashboard by-Example: A Hypergraph-based Approach to On-demand Data warehousing systems," IEEE International Conference on Systems, Man, and Cybernetics, 2012, pp. 1853-1858.

Zhang, Shuo et al., "Ad Hoc Table Retrieval using Semantic Similarity," IW3C2, Creative Commons CC by 4.0 License, 2018, pp. 1553-1562.

Key, Alicia et al., "VizDeck: Self-Organizing Dashboards for Visual Analytics," SIGMOD International Conference on Management of Data, 2012, pp. 681-684.

Mackinlay, Jock, "Automating the Design of Graphical Presentations of Relational Information," ACM Transactions on Graphics, 1986, vol. 5, No. 2, pp. 110-141.

Touma, Rizkallah et al., "Supporting Data integration Tasks with Semi-Automatic Ontology Construction," DOLAP '15: Proceedings of the ACM Eighteenth International Workshop on Datawarehousing and OLAP, 2015, pp. 89-98.

(56) References Cited

OTHER PUBLICATIONS

Mazumdar, Suvodeep et al., "A Knowledge Dashboard for Manufacturing Industries," ESWC 2011 Workshops, LNCS 7117, 2012, pp. 112-124.
Matera, Maristella et al., "Peudom: A Mashup Platform for the End User Development of Common Information Spaces," ICWE 2013, LNCS 7977, 2013, pp. 494-497.
Theorin, Alfred et al., "An Event-Driven Manufacturing Information System Architecture," IFAC/IEEE Symposium on Information Control Problems in Manufacturing, 2015, pp. 1-9.
Lennerholt, Christian et al., "Implementation Challenges of Self Service Business Intelligence: A Literature Review," Proceedings of the 51st Hawaii International Conference on System Sciences, 2018, pp. 5055-5063.
Elias, Micheline et al., "Exploration Views: Understanding Dashboard Creation and Customization for Visualization Novices," INTERACT 2011. Part IV. LNCS 6949, 2011, pp. 274-291.
Buccella, Agustina et al., "Ontology-Based Data Integration Methods: A Framework for Comparison," Revista Coiombianade Computación, 2005, vol. 6, No. 1, pp. 1-24.
Roberts, Jonathan C., "State of the Art: Coordinated & Multiple Views in Exploratory Visualization." Proceedings of the 5th international Conference on Coordinated & Multiple Views in Exploratory Visualization, IEEE Computer Society Press, 2007, pp. 61-71.
Palpanas, Themis et al., "Integrated model-driven dashboard development," Information Systems Frontiers, 2007, vol. 9, pp. 1-14.
Resnick, Marc L., "Building The Executive Dashboard," Proceedings of the Human Factors and Ergonomics Society 47th Annual Meeting, 2003, pp. 1639-1643.
Sarikaya, Alper et al., "What Do We Talk About When We Talk About Dashboards?," IEEE Transactions on Visualization and Computer Graphics, 2018, pp. 1-11.
Boury-Brisset, Anne-Claire, "Ontology-based Approach for Information Fusion," Proceedings of the Sixth International Conference on Information Fusion, 2003, Vol. 1, pp. 522-529.
Park, Laurence A. F. et al., "A Blended Metric for Muiti-label Optimisation and Evaluation," ECML/PKDD, 2018, pp. 1-16.
Kintz, Maximilien, "A Semantic Dashboard Description Language for a Process-oriented Dashboard Design Methodology," 2nd International Workshop on Mode-based Interactive Ubiquitous Systems, 2012, pp. 1-6.
Bergamaschi, Sonia et al., "A Semantic Approach to ETL Technologies," Data & Knowledge Engineering, 2011, pp. 1-24.
Office Communication for U.S. Appl. No. 16/368,390 dated Mar. 2, 2020, pp. 1-8.
International Search Report and Written Opinion for International Patent Application No. PCT/US2020/038157 dated Oct. 6, 2020, pp. 1-8.
International Search Report and Written Opinion for International Patent Application No. PCT/US2020/057780 dated Feb. 2, 2021, pp. 1-8.
Arai, Taichi et al., "Preventing the creation of misleading graphs, Targeted learning tool," IPSJ SIG Technical Report [online], Mar. 12, 2018, vol. 2018-GN-104 No. 4, ISSN 2188-8744, pp. 1-17.
Barowy, Daniel W. et al., "ExceLint: Automatically Finding Spreadsheet Formula Errors," In Proceedings of the ACM Programming Languages 2, OOPSLA, 2018, Article 148, pp. 1-26.
Barowy, Daniel W. et al., "CheckCell: Data Debugging for Spreadsheets," ACM SIGPLAN Notices, 2014, vol. 49, Iss. 10, pp. 507-523.
Donaldson, Alastair F. et al., "Automated Testing of Graphics Shader Compilers," In Proceedings of the ACM Programming Languages 1, OOPSLA, 2017, Article 93, pp. 1-29.
Dragicevic, Pierre et al., "Increasing the Transparency of Research Papers with Explorable Multiverse Analyses," In Proceedings of The ACM CHI Conference on Human Factors in Computing Systems, 2019, Glasgow, United Kingdom, pp. 1-16.
Gotz, David et al., "Visualization Model Validation via Inline Replication," Information Visualization, 2019, pp. 405-425.
Guderlei, Ralph et al., "Statistical Metamorphic Testing—Testing Programs With Random Output by Means of Statistical Hypothesis Tests and Metaphoric Testing," In Seventh International Conference on Quality Software, IEEE, 2007, pp. 404-409.
Guo, Yue et al., "What You See is Not What You Get!: Detecting Simpson's Paradoxes During Data Exploration," In ACM SIGMOD Workshop on Human-in-the-Loop Data Analytics (HILDA), 2017, Article 2, pp. 1-5.
Hynes, Nick et al., "The Data Linter: Lightweight, Automated Sanity Checking for ML Data Sets," In NIPS: Workshop on Systems for ML and Open Source Software, 2017, pp. 1-7.
Kindlmann, Gordon et al., "An Algebraic Process for Visualization Design," IEEE Transactions on Visualization and Computer Graphics, 2014, vol. 20, No. 12, pp. 2181-2190.
Kirby, Robert M. et al., "The Need for Verifiable Visualization," IEEE Computer Graphics and Applications, 2008, vol. 28, No. 5, pp. 78-83.
McNutt, Andrew et al., "Linting for Visualization: Towards a Practical Automated Visualization Guidance System," In VisGuides: 2nd Workshop on the Creation, Curation, Critique and Conditioning of Principles and Guidelines in Visualization, 2018, pp. 1-14.
Muşlu, Kivanç et al., "Preventing Data Errors with Continuous Testing," In Proceedings of the 2015 International Symposium on Software Testing and Analysis, ACM, 2015, pp. 373-384.
Salimi, Babak et al., "Bias in OLAP Queries: Detection, Explanation, and Removal." In Proceedings of the 2018 International Conference on Management of Data, ACM, 2018, pp. 1021-1035.
Tang, Nan et al., "Towards Democratizing Relational Data Visualization," In Proceedings of the 2019 International Conference on Management of Data, ACM, 2019, pp. 2025-2030.
Wall, Emily et al., "Warning, Bias May Occur: A Proposed Approach to Detecting Cognitive Bias In Interactive Visual Analytics," In 2017 IEEE Conference on Visual Analytics Science and Technology (VAST), IEEE, 2017, pp. 104-115.
Wickham, Hadley et al., "Graphical Inference for Infovis," IEEE Transactions on Visualization and Computer Graphics 16, 2010, pp. 973-979.
Anand, Anushka et al., "Automatic Selection of Partitioning Variables for Small Mulitiple Displays," IEEE Transactions on Visualization and Computer Graphics, 2015, vol. 22, Iss. 1, pp. 669-677.
Anonymous, "Glitchart: When charts attack," https://glitch-chart.tumblr.com/, 2019, Accessed Feb. 5, 2020, pp. 1-1.
Armstrong, Zan et al., "Visualizing Statistical Mix Effects and Simpson's Paradox," IEEE Transactions on Visualization and Computer Graphics, 2014, vol. 20, No. 12, pp. 2132-2141.
Barr, Earl T. et al., "The Oracle Problem in Software Testing: A Survey," IEEE Transactions on Software Engineering, 2015, vol. 41, No. 5, pp. 507-525.
Binnig, Carsten et al., "Toward Sustainable Insights, or Why Polygamy is Bad for You," In Proceedings of the 8th Biennial Conference on Innovative Data Systems Research, 2017, pp. 1-7.
Borland, David et al., "Contextual Visualization," IEEE Computer Graphics and Applications, 2018, vol. 38, No. 6, pp. 17-23.
Bresciani, Sabrina et al., "The Risks of Visualization," Identität und Vielfalt der Kommunikations-wissenschaft, 2009, pp. 1-22.
Bresciani, Sabrina et al., "The Pitfalls of Visual Representations: A Review and Classification of Common Errors Made While Designing and Interpreting Visualizations," SAGE Open, 2015, pp. 1-14.
Cairo, Alberto, "Graphic Lies, Misleading Visuals," In New Challenges for Data Design, Springer, 2015, pp. 103-116.
Chi, Ed Huai-Hsin, "A Taxonomy of Visualization echniques Using the Data State Reference Model," In IEEE Symposium on Information Visualizations, 2000, pp. 69-75.
Chiw, Charisee et al., "DATm: Diderot's Automated Testing Model," In IEEE/ACM 12th International Workshop on Automation of Software Testing (AST), IEEE, 2017, pp. 45-51.
Cleveland, William S. et al., "Variables on Scatterplots Look More Highly Correlated When the Scales are Increased," Science, 1982, vol. 216, No. 4550, pp. 1138-1141.
Cockburn, Andy et al., "Hark No More: On the Preregistration of CHI Experiments," In Proceedings of the 2018 CHI Conference on Human Factors in Computing Systems, ACM, 2018, pp. 1-12.

(56) References Cited

OTHER PUBLICATIONS

Correll, Michael, "Ethical Dimensions of Visualization Research," In Proceedings of the 2019 CHI Conference on Human Factors In Computing Systems, ACM, 2019, pp. 1-13.
Correll, Michael et al., "Truncating the Y-Axis: Threat or Menace?," arXiv preprint arXiv:1907.02035, 2019, pp. 1-12.
Correll, Michael et al., "Surprise! Bayesian Weighting for De-Biasing Thematic Maps," IEEE Transactions on Visualization and Computer Graphics, 2016, pp. 1-10.
Correll, Michael et al., "Black Hat Visualization," In IEEE VIS; Workshop on Dealing With Cognitive Biases in Visualizations, 2017, pp. 1-4.
Correll, Michael et al., "Looks Good To Me: Visualizations as Sanity Checks," IEEE Transactions on Visualizations and Computer Graphics, 2018, pp. 1-10.
Diehl, Alexandra et al., "VisGuides: A Forum for Discussing Visualization Guidelines," In Proceedings of the Eurographics/IEEE VGTC Conference on Visualization: Short Papers, Eurographics Asscociation, 2018, pp. 61-65.
D'Ignazio, Catherine et al., "Feminist Data Visualization," In IEEE VIS: Workshop on Visualization for the Digital Humanities (VIS4DH), 2016, pp. 1-5.
Dimara, Evanthia et al., "A Task-Based Taxonomy of Cognitive Biases for Information Visualization," IEEE Transactions on Visualization and Computer Graphics, 2018, pp. 1-21.
Dörk, Marian et al., "Critical InfoVis: Exploring the Politics of Visualization," In 2013 ACM SIGCHI Conference on Human Factors in Computing Systems, Extended Abstracts, 2013, pp. 2189-2198.
Efron, Bradley, "Bootstrap Methods: Another Look at the Jackknife," The Annals of Statistics, 1979, vol. 7, No. 1, pp. 1-26.
Filipov, Velitchko et al., "CV3: Visual Exploration, Assessment, and Comparison of CVs," In Computer Graphics Forum, Wiley Online Library, 2019, pp. 107-118.
Ford, Brian, "Write-Good: Naive Linter for English Prose," https://github.com/btford/write-good Accessed: Feb. 6, 2020, pp. 1-6.
Gelman, Andrew et al., "The garden of forking paths: Why multiple comparisons can be a problem, even when there is no "fishing expedition" or"p-hacking" and the research hypothesis was posited ahead of time," Department of Statistics, Columbia University, 2013, pp. 1-17.
World Bank Group, "World Development Indicators," http://datatopics.worldbank.org/world-development-indicators/, 2020, pp. 1-6.
Haraway, Donna, "Situated Knowledges: The Science Question in Feminism and the Privilege of Partial Perspective," Feminist Studies, 1988, vol. 14, No. 3, pp. 575-599.
Heer, Jeffrey, "Agency plus automation: Designing artificial intelligence into interactive systems," In Proceedings of the National Academy of Sciences, 2019, vol. 116, No. 6, pp. 1844-1850.
Heer, Jeffrey, "Visualization is Not Enough," https://homes.cs.washington.edu/~jheer/talks/EuroVis2019-Capstone.pdf EuroVis Capstone, 2019, pp. 1-113.
Heer, Jeffrey et al., "Multi-Scale Banking to 45 Degrees," IEEE Transactions on Visualization and Computer Graphics, 2006, vol. 12, No. 5, pp. 701-708.
Hibbard, William L. et al., "A Lattice Model for Data Display," In Proceedings of the Conference on Visualization, IEEE Computer Society Press, 1994, pp. 310-317.
Hofmann, Heike et al., "Graphical Tests for Power Comparison of Competing Designs," IEEE Transactions on Visualization and Computer Graphics, 2012, vol. 18, No. 12, pp. 2441-2448.
Huff, Darrell, "How to Lie With Statistics," WW Norton & Company, 31st Printing, 1993, pp. 1-141.
Hullman, Jessica et al., "Visualization Rhetoric: Framing Effects in Narrative Visualization," IEEE Transaction on Visualization and Computer Graphics, 2011, vol. 17, No. 12, pp. 2231-2240.
Isenberg, Tobias et al., "A Systematic Review on the Practice of Evaluating Visualization," IEEE Transactions on Visualization and Computer Graphics, 2013, vol. 19, No. 12, pp. 2818-2827.
Jannah, Hassan M., "MetaReader: A Dataset Meta-Exploration and Documentation Tool," 2014, pp. 1-11.
Johnson, Stephen C., "Lint, a C Program Checker," Citeseer, 1977, pp. 1-12.
Kandel, Sean et al., "Research directions in data wrangling: Visualizations and transformations for usable and credible data," Information Visualization, 2011, vol. 10, No. 4, pp. 271-288.
Kandel, Sean et al., "Profiler: Integrated Statistical Analysis and Visualization for Data Quality Assessment," In Proceedings of the international Working Conference on Advanced Visual Interfaces, ACM, 2012, pp. 547-554.
Kim, Won et al., "A Taxonomy of Dirty Data," Data Mining and Knowledge Discovery, 2003, vol. 7, No. 1, pp. 81-89.
Kindlmann, Gordon et al., "Algebraic Visualization Design for Pedagogy," IEEE VIS: Workshop on Pedagogy of Data Visualization, 2016, pp. 1-5.
Kong, Ha-Kyung et al., "Frames and Slants in Titles of Visualizations on Controversial Topics," In Proceedings of the 2018 CHI Conference on Human Factors in Computing Systems, ACM, 2018, pp. 1-12.
Kong, Ha-Kyung et al., "Trust and Recall of Information across Varying Degrees of Title—Visualization Misalignment," In Proceedings of the 2019 CHI Conference on Human Factors in Computing Systems, ACM, 2019, 346, pp. 1-13.
Amperser Labs, "Proselint: A linter for prose," http://proselint.com/, Accessed: Feb. 10, 2020, pp. 1-3.
Lavigne, Sam et al., "Predicting Financial Crime: Augmenting the Predictive Policing Arsenal," arXiv preprint arXiv:1704.07826, 2017, pp. 1-3.
Ziemkiewicz, Caroline et al., "Embedding Information Visualization Within Visual Representation," In Advances in Information and Intelligent Systems, Springer, 2009, pp. 1-20.
Zhou, Zhi Quan et al., "Metamorphic Testing of Driverless Cars," Communications of the ACM, 2019, vol. 62, No. 3, pp. 61-67.
Zhao, Zheguang et al., "Controlling False Discoveries During Interactive Data Exploration," In proceedings of the 2017 International Conference on Management of Data, ACM, 2016, pp. 527-540.
Lundgard, Alan et al., "Sociotechnical Considerations for Accessible Visualization Design," IEEE Transactions on Visualization and Computer Graphics, 2019, pp. 1-5.
Lunzer, Aran et al., "It Ain't Necessarily So: Checking Charts for Robustness," IEEE VisWeek Poster Proceedings, 2014, pp. 1-3.
Lupi, Giorgia, "Data Humanism: The Revolutionary Future of Data Visualization," Print Magazine 30, 2017, pp. 1-10.
MacKinlay, Jock et al., "Show Me: Automatic Presentation for Visual Analysis," IEEE Transactions on Visualization and Computer Graphics, 2007, vol. 13, No. 6, pp. 1137-1144.
Matejka, Justin et al., "Same Stats, Different Graphs: Generating Datasets with Varied Appearance and Identical Statistics Through Simulated Annealing," In Proceedings of the 2017 CHI Conference on Human Factors in Computing Systems, ACM, 2017, pp. 1290-1294.
Mayorga, Adrian et al., "Splatterplots: Overcoming Overdraw in Scatter Plots," IEEE Transactions on Visualization and Computer Graphics, 2013, vol. 19, No, 9, pp. 1526-1538.
Mayr, Eva et al., "Trust in Information Visualization," In EuroVis Workshop on Trustworthy Visualization (TrustVis), Robert Kosara, Kai Lawonn, Lars Linsenm, and Noeska Smit (Eds.), The Eurographics Association, 2019, pp. 1-5.
Micallef, Luana et al., "Towards Perceptual Optimization of the Visual Design of Scatterplots," IEEE Transactions on Visualization and Computer Graphics, 2017, vol. 23, No. 6, pp. 1-12.
Moere, Andrew Vande, "Towards Designing Persuasive Ambient Visualization," In Issues in the Design & Evaluation of Ambient information Systems Workshop, Citeseer, 2007, pp. 48-52.
Moritz, Dominik et al., "Formalizing Visualization Design Knowledge as Constraints: Actionable and Extensible Models in Draw," IEEE Transactions on Visualization and Computer Graphics, 2018, vol. 25, No. 1, pp. 438-448.
Newman, George E. et al., "Bar graphs depicting averages are perceptually misinterpreted: The within-the-bar bias," Psychonomic Bulletin & Review, 2012, vol. 19, No. 4, pp. 601-607.

(56) References Cited

OTHER PUBLICATIONS

Onuoha, Mimi, "On Missing Data Sets,"https://github.com/mimionuoha/missing-datasets, Accessed: Feb. 10, 2020, pp. 1-3.
Pandey, Anshul Vikram et al., "How Deceptive are Deceptive Visualizations?: An Empirical Analysis of Common Distortion Techniques," In Proceedings of the 33rd Annual ACM Conference on Human Factors in Ciomputing Systems, ACM, 2015, pp. 1469-1478.
Pirolli, Peter et al., "The Sensemaking Process and Leverage Points for Analyst Technology as Identified Through Cognitive Task Analysis," In Proceedings of International Conference on Intelligence Analysis, 2005, vol. 5, pp. 1-6.
Plaisant, Catherine, "Information Visualization and the Challenge of Universal Usability," In Exploring Geovisualization, Elsevier, 2005, pp. 1-19.
Pu, Xiaoying et al., "The Garden of Forking Paths in Visualization: A Design Space for Reliable Exploratory Visual Analyics: Position Paper," in IEEE VIS: Evaluation and Beyond—Methodological Approaches for Visualization (BELIV), IEEE, 2018, pp. 37-45.
Qu, Zening et al., "Keeping Multiple Views Consistent: Constraints, Validations, and Exceptions in Visualization Authoring," IEEE Transactions on Visualization and Computer Graphics, 2017, vol. 24, No. 1, pp. 468-477.
Raman, Vijayshankar et al., "Potter's Wheel: An Interactive Data Cleaning System," In Proceedings of the 27th International Conference on Very Large Data Bases, 2001, vol. 1, pp. 381-390.
Redmond, Stephen, "Visual Cues in Estimation of Part-To-Whole Comparisons," IEEE Transactions on Visualization and Computer Graphics, 2019, pp. 1-6.
Ritchie, Jacob et al., "A Lie Reveals the Truth: Quasimodes for Task-Aligned Data Presentation," In Proceedings of the 2019 CHI Conference on human Factors in Computing Systems, ACM, 193, 2019, Pages 1-13.
Rogowitz, Bernice E. et al., "The "Which Blair Project": A Quick Visual Method for Evaluating Perceptual Color Maps," in IEEE Visualization 2001. Proceedings, 2001, pp. 183-190.
Rogowitz, Bernice E. et al., "How Not to Lie with Visualization," Computers in Physics, 1996, vol. 10, No. 3, pp. 268-273.
Rosling, Hans et al., "Health advocacy with Gapminder animated statistics," Journal of Epidemiology and Global Health, 2011, vol. 1, No. 1, pp. 11-14.
Sacha, Dominik et al., "The Role of Uncertainty, Awareness, and Trust in Visual Analytics," IEEE Transactions on Visualization and Computer Graphics, 2016, vol. 22, No. 1, pp. 240-249.
Satyanarayan, Arvind et al., "Vega-Lite: A Grammar of Interactive Graphics," IEEE Transactions on Visualization and Computer Graphics, 2016, vol. 23, No. 1, pp. 341-350.
Segura, Sergio et al., "A Survey on Metamorphic Testing," IEEE Transactions on Software Engineering, 2016, vol. 42, No. 9, pp. 805-824.
Song, Hayeong et al., "Where's My Data? Evaluating Visualizations with Missing Data," IEEE Transactions on Visualization and Computer Graphics, 2018, vol. 25, no. 1, pp. 914-924.
Srinivasan, Arjun et al., "Augmenting Visualizations with interactive Data Facts to Facilitate Interpretation and Communication," IEEE Transactions on Visualization and Computer Graphics, 2018, vol. 25, No. 1, pp. 672-681.
Stonebraker, Michael et al., "Data Curation at Scale: The Data Tamer System," In Proceedings of the 6th Biennial Conference on Innovative Data Systems Research, 2013, pp. 1-10.
Szafir, Danielle Albers, "The Good, the Bad, and the Biased: Five Ways Visualizations Can Mislead (and How to Fix Them)," ACM Interactions, 2018, vol. 25, No. 4, pp. 26-33.
Tableau, "Tableau Prep," https://www.tableau.com.products/prep/, 2020, pp. 1-13.
Trifacta, "Trifacta," https://www.trifacta.com/, 2020, pp. 1-8.
Trulia, "New York Real Estate Market Overview," https://www.trulia.com/real_estate/New_York-New_York/, 2020, Accessed: Feb. 11, 2020, pp. 1-3.
Valdez, André Calero et al., "A Framework for Studying Biases in Visualization Research," 2017, pp. 1-5.
Van Wijk, Jarke J., "The Value of Visualization," in VIS 05, IEEE Visualization, 2005, IEEE, pp. 79-86.
Vanderplas, Jacob et al., "Altair: Interactive Statistical Visualizations for Python," The Journal of Open Source Software, 2018, vol. 3, No. 32, pp. 1-2.
Veras, Rafael et al., "Discriminability Tests for Visualization Effectiveness and Scalability," IEEE Transactions on Visualization and Computer Graphics, 2019, pp. 1-10.
Vickers, Paul et al., "Understanding Visualization: A Formal Foundation using Category Theory and Semiotics," IEEE Transactions on Visualization and Computer Graphics, 2012, vol. 19, No. 6, pp. 1-14.
Wainer, Howard, "How to Display Data Badly," The American Statistician, 1984, vol. 38, No. 2, pp. 137-147.
Wang, Pei et al., "Uni-Detect: A Unified Approach to Automated Error Detection in Tables," In Proceedings of the 2019 International Conference on Management of Data, ACM, 2019, pp. 811-828.
Whitworth, Brian, "Polite Computing," Behaviour & Information Technology, 2005, vol. 24, No. 5, pp. 353-363.
Wood, Jo et al., "Design Exposition with Literate Visualization," IEEE Transactions on Visualization and Computer Graphics, 2018, vol. 25, No. 1, pp. 759-768.
Wu, Eugene et al., "Scorpion: Explaining Away Outliers in Aggregate Queries," Proceedings of the VLDB Endowment, 2013, vol. 6, No. 8, pp. 553-564.
Xiong, Cindy et al., "Illusion of Causality in Visualized Data," arXiv preprint arXiv:1908.00215, 2019, pp. 1-10.
Xiong, Cindy et al., "The Curse of Knowledge in Visual Data Communication," IEEE Tranactions on Visualization and Computer Graphics, 2019, pp. 1-12.
Zgraggen, Emanuel et al., "Investigating the Effect of the Multiple Comparisons Problem in Visual Analysis," In Proceedings of the 2018 CHI Conference on Human Factors in Computing Systems, ACM, 2018, pp. 1-12.
International Search Report and Written Opinion for International Patent Application No. PCT/US2020/050722 dated Nov. 24, 2020, pp. 1-6.
Office Communication for U.S. Appl. No. 16/732,027 dated Jun. 14, 2021, pp. 1-22.
Office Communication for U.S. Appl. No. 16/915,963 dated Jul. 19, 2021, pp. 1-9.
International Search Report and Written Opinion for International Patent Application No. PCT/US2022/012907 dated Mar. 16, 2022, pp. 1-13.
Office Communication for U.S. Appl. No. 16/915,963 dated Apr. 26, 2022, pp. 1-9.
Office Communication for U.S. Appl. No. 16/672,130 dated May 19, 2022, pp. 1-33.
International Search Report and Written Opinion for International Patent Application No. PCT/US2021/043167 dated Oct. 26, 2021, pp. 1-7.
International Search Report and Written Opinion for International Patent Application No. PCT/US2021/043177 dated Oct. 26, 2021, pp. 1-8.
Office Communication for U.S. Appl. No. 16/732,027 dated Nov. 15, 2021, pp. 1-25.
International Search Report and Written Opinion for International Patent Application No. PCT/US2021/049229 dated Nov. 16, 2021, pp. 1-8.
Office Communication for U.S. Appl. No. 16/944,064 dated Nov. 26, 2021, pp. 1-50.
Office Communication for U.S. Appl. No. 16/672,130 dated Jan. 5, 2022, pp. 1-32.
Office Communication for U.S. Appl. No. 16/915,963 dated Jan. 7, 2022, pp. 1-9.
Wu, Aoyu et al., "MultiVision: Designing Analytical Dashboards with Deep Learning Based Recommendation," IEEE, arXiv preprint, arXiv:2107.07823, Jul. 2021, pp. 1-11.
Shi, Danqing et al., "Talk2Data: High-Level Question Decomposition for Data-Oriented Question and Answering," arXiv preprint, arXiv:2107.14420, Jul. 2021, pp. 1-11.

(56) References Cited

OTHER PUBLICATIONS

Wang, Yun et al., "DataShot: Automatic Generation of Fact Sheets from Tabular Data," IEEE Transactions on Visualization and Computer Graphics, vol. 26, No. 1, Aug. 2019, pp. 1-11.

Wang Baldonado, Michelle Q. et al., "Guidelines for Using Multiple Views in Information Visualization," AVI '00, In Proceedings of the Working Conference on Advanced Visual interfaces, May 2000, pp. 1-10.

Chen, Xi et al., "Composition and Configuration Patterns in Multiple-View Visualizations," arXiv preprint, arXiv:2007.15407, Aug. 2020, pp. 1-11.

Crisan, Anamaria et al., "GEVITRec: Data Reconnaissance Through Recommendation Using a Domain-Specific Visualization Prevalence Design Space," IEEE Transactions on Visualization and Computer Graphics, TVCG Submission, Jul. 2021, pp. 1-18.

Office Communication for U.S. Appl. No. 16/732,027 dated Feb. 25, 2022, pp. 1-6.

Office Communication for U.S. Appl. No. 16/944,085 dated Mar. 17, 2022, pp. 1-6.

Office Communication for U.S. Appl. No. 16/903,965 dated Mar. 18, 2022, pp. 1-11.

Office Communication for U.S. Appl. No. 16/915,963 dated Mar. 22, 2022, pp. 1-10.

Office Communication for U.S. Appl. No. 16/915,963 dated Mar. 23, 2022, pp. 1-4.

Office Communication for U.S. Appl. No. 16/903,967 dated Sep. 27, 2021, pp. 1-16.

Office Communication for U.S. Appl. No. 16/732,027 dated Jun. 14, 2022, pp. 1-18.

Office Communication for U.S. Appl. No. 17/158,911 dated Jun. 28, 2022, pp. 1-29.

Office Communication for U.S. Appl. No. 16/672,130 dated Aug. 2, 2022, pp. 1-5.

Office Communication for U.S. Appl. No. 16/944,085 dated Aug. 30, 2022, pp. 1-9.

* cited by examiner

AUTOMATIC DATA MODEL GENERATION

TECHNICAL FIELD

The present invention relates generally to data analysis, and more particularly, but not exclusively to, generating data models.

BACKGROUND

Organizations are generating and collecting an ever increasing amount of data. This data may be associated with disparate parts of the organization, such as, consumer activity, manufacturing activity, customer service, server logs, or the like. In some cases, organizations may develop a variety of different data sources or data models to represent the information they may be interested in analyzing. Also, in some cases, the amount of data available to an analyst may exceed the immediate or local needs of the analyst. Further, in some cases, some of the data sources or data models available to an analyst may be arranged in ways that are unfamiliar or irrelevant to the analyst. Likewise, in some cases, analysts may be required to duplicate data designs or data models previously provided by other analysts because of difficulties associated with discovering the previously provided data models or data sources. Also, in some embodiments, given the complex nature of some data sources or data models, analysts may be required to have advanced data design skills or deep knowledge of the underlying data systems to generate their own data models. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
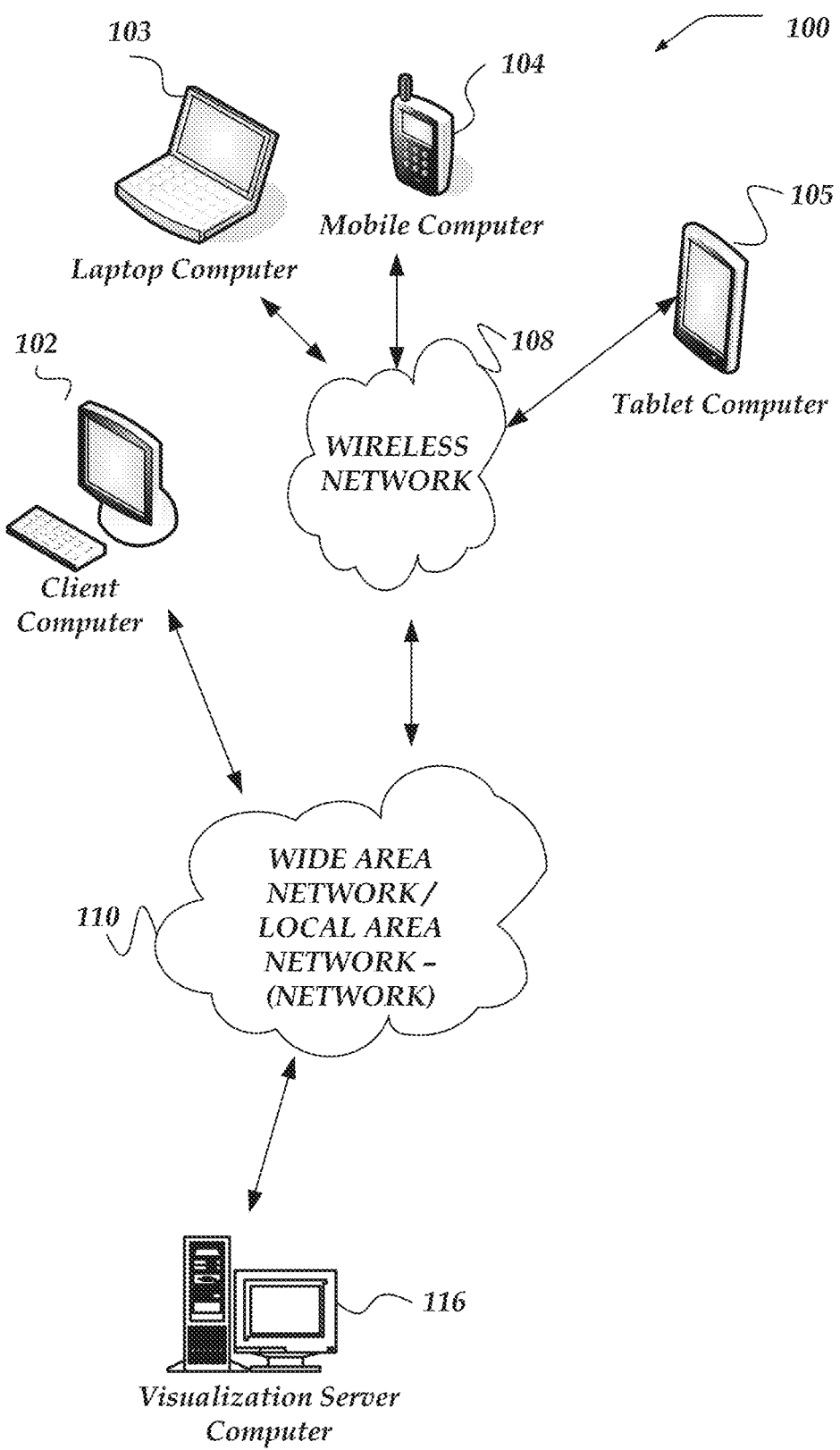
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to the source of the underlying information that is being modeled or otherwise analyzed. Data sources may include information from or provided by databases (e.g., relational, graph-based, no-sql, or the like), file systems, unstructured data, streams, or the like. Data sources are typically arranged to model, record, or memorialize various operations or activities associated with an organization. In some cases, data sources are arranged to provide or facilitate various data-focused actions, such as, efficient storage, queries, indexing, data exchange, search, updates, or the like. Generally, a data source may be arranged to provide features related to data manipulation or data management rather than providing an easy to understand presentation or visualization of the data.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein, the term "data model field" refers to named or nameable properties or features of a data model. Data model fields are analogous to columns in a database tables, nodes in a graph, Java class attributes, and so on. For example, a data model that corresponds to an employee database table, may have data model fields, such as, name, email-address, telephone-number, employee-id, or the like.

As used herein the term "data object" refers to one or more entities or data structures that comprise data models. In some cases, data objects may be considered portions of the data model. Data objects may represent individual instances of items or classes or kinds of items.

As used herein the term "data field" refers to a named or nameable property or attribute of a data object. In some cases, data fields may be considered analogous to class members of an object in object oriented programming.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "working data model" refers to a data model that may be in the process of being developed or modeled. The term is used to differentiate working data models from other data models, such as, those that may include one or more recommended data fields or data objects.

As used herein the term "working visualization" refers to a visualization that may be in process of being developed or modeled. The term is primarily used to differentiate visualizations being developed or modeled from other visualizations.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data visualizations using one or more processors that execute one or more instructions to perform as described herein.

In one or more of the various embodiments, a data source, a model panel, and a display panel may be provided such that the data source may be associated with one or more data models that each include a plurality of data fields.

In one or more of the various embodiments, in response to a provided search expression, further actions may be performed, as described below.

In one or more of the various embodiments, one or more candidate data fields may be determined based on the search expression or the one or more data models such that one or more values associated with each candidate data field may match the provided search expression. And, in some embodiments, the one or more candidate data fields may be displayed in the model panel.

In one or more of the various embodiments, a working data model may be generated based on a portion of the one or more candidate data fields such that the portion of the one or more candidate data fields may be included in the working data model.

In one or more of the various embodiments, one or more visualizations may be determined based on one or more recommendation models and the working data model such that a portion of the one or more visualizations may be determined based on one or more shared data fields that may be included in the working data model and the one or more visualizations. And, in some embodiments, the one or more visualizations may be listed in the display panel.

In one or more of the various embodiments, a working visualization may be determined based on a visualization listed in the display panel and the working data model such that one or more data fields included in the working data model may be associated with the working visualization.

In one or more of the various embodiments, in response to updating the working data model to include one or more other candidate data fields, one or more of the one or more candidate data fields, the one or more recommended visualizations, or the working visualization may be updated based on the updated working data model.

In one or more of the various embodiments, one or more recommended visualizations may be determined based on their association with one or more data fields in the working model and another data field that may be included in the one or more other visualizations such that the one or more recommended visualizations may be listed in the display panel. And, in some embodiments, in response to a selection of one recommended visualization, the updated working model may be updated to include the other data field.

In one or more of the various embodiments, one or more characteristics associated with the one or more candidate data fields may be determined such that the one or more characteristics include one or more of a count of a number of visualizations that reference the one or more candidate data fields, data source information associated with the one or more candidate data fields, a sample of values of the one or more candidate data fields, or the like. And, in some embodiments, one or more portions of the one or more characteristics for each selected one or more candidate data fields may be displayed in a field information panel.

In one or more of the various embodiments, another candidate data field may be determined from the one or more candidate data fields. In some embodiments, the working visualization may be updated to include the other candidate data field. And, in some embodiments, the working data model may be updated to include the other candidate data field.

In one or more of the various embodiments, one or more popular data fields may be determined based on the one or more data models such that the one or more popular data fields may be determined based on one or more metrics associated with the one or more popular data fields and such that the one or more popular fields may be displayed in a tab panel. In some embodiments, a collection of one or more popular visualizations may be determined based on the one or more popular data fields such that the one or more popular visualizations may be displayed in the display panel. In some embodiments, a portion of the one or more popular data fields may be determined such that the portion of the one or more popular data fields may be selected by a user. And, in some embodiments, the collection of the one or more popular visualizations may be modified based on the portion of the one or more popular fields such that each popular visualization that may be associated with the portion of the one or more popular data fields may be included in the collection and each popular visualization that may be unassociated with the portion of the one or more popular fields may be excluded from the collection.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 or the like, as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
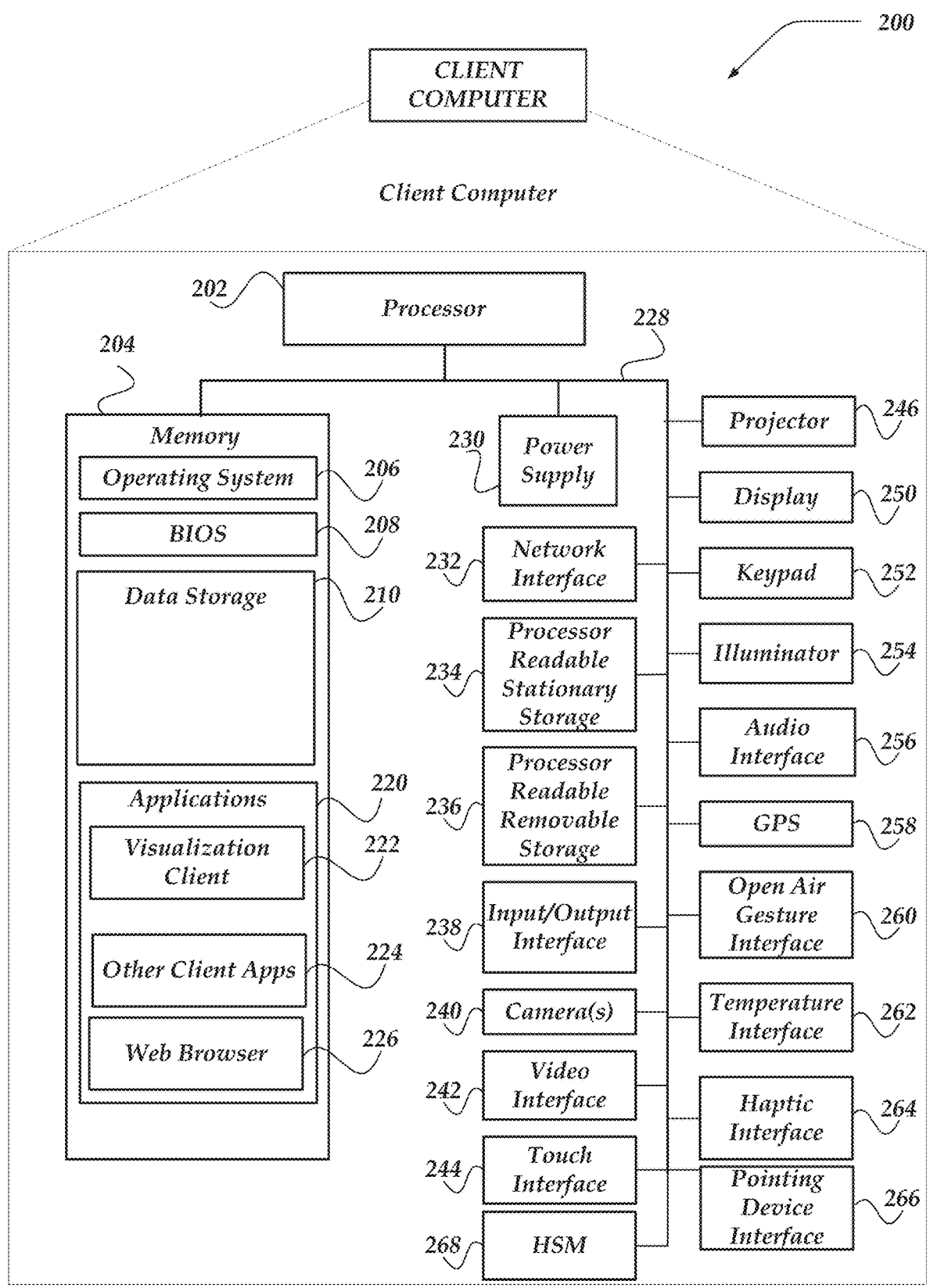
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, visualization client 222, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, visualization client 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
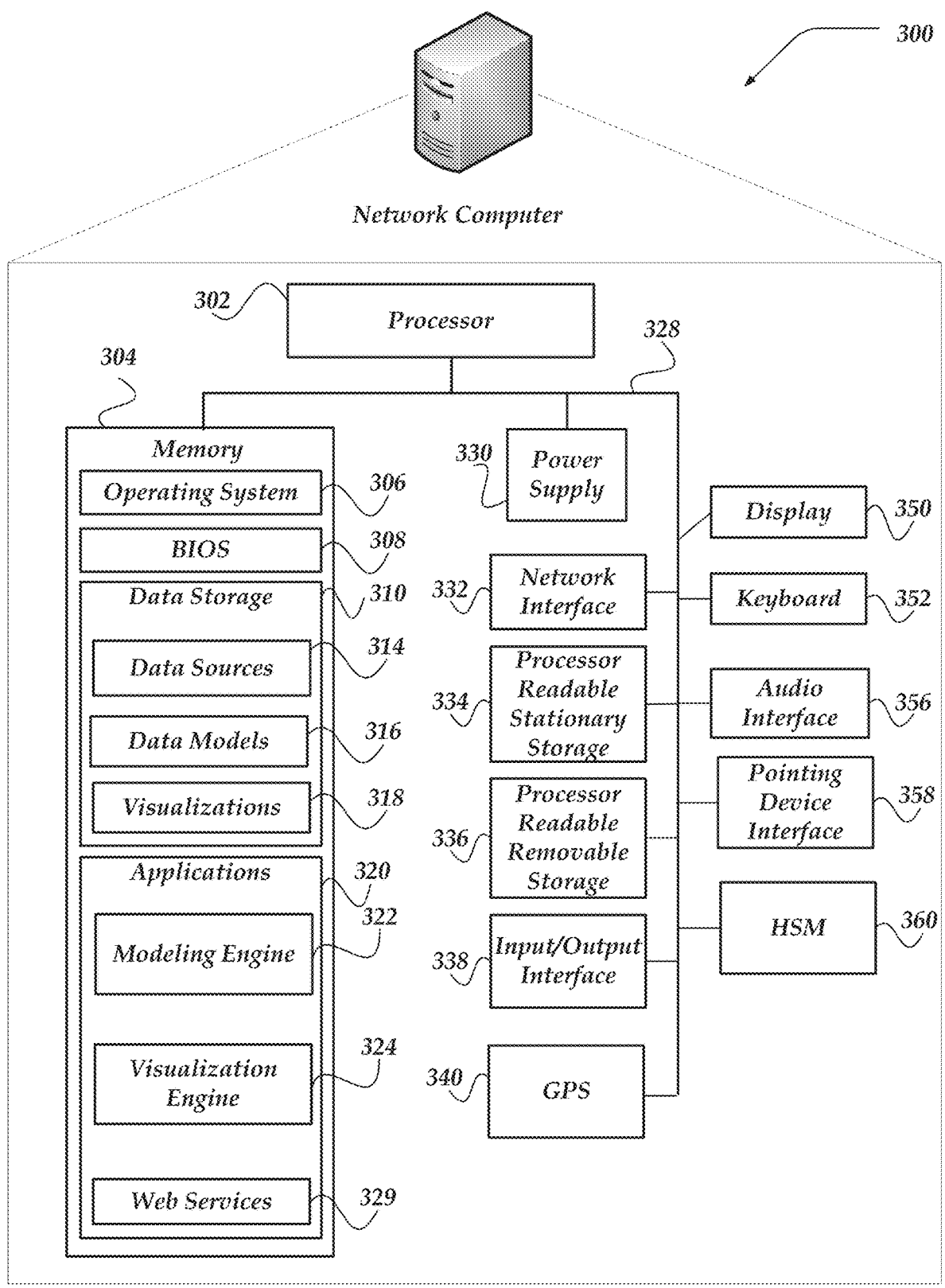
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, visualization engine 324, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data sources 314, data models 316, visualizations 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, visualization engine 324, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, visualization engine 324, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, visualization engine 324, other applications 329, or the like, may be provisioned and de-commissioned automatically.

Also, in one or more of the various embodiments, modeling engine 322, visualization engine 324, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
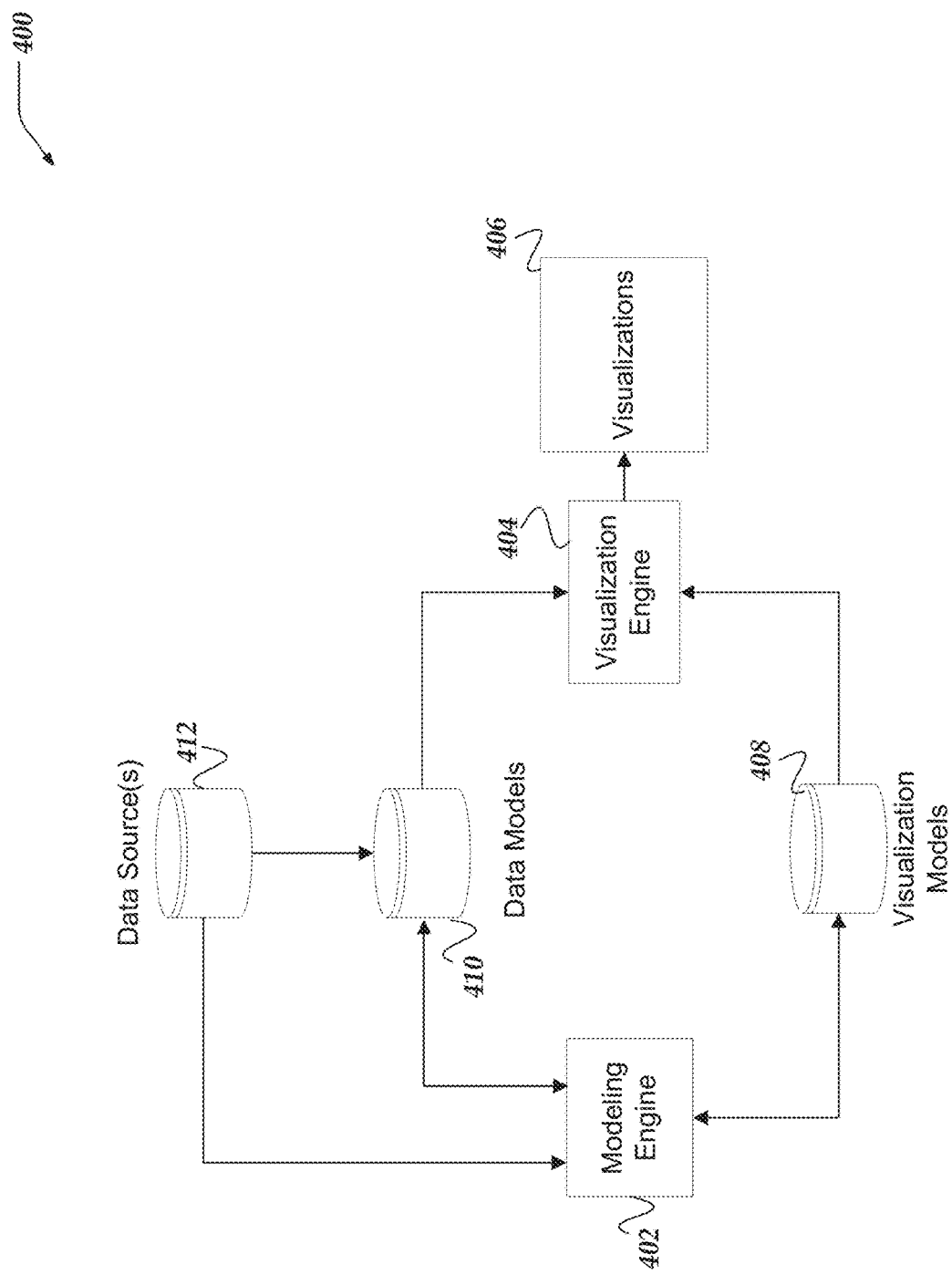
FIG. 4 illustrates a logical architecture of a system for automatic data model generation in accordance with one or more of the various embodiments.

FIG. 4 illustrates a logical architecture of system 400 for automatic data model generation in accordance with one or more of the various embodiments. In one or more of the various embodiments, system 400 may be a data modeling platform arranged to include various components including: modeling engine 402; visualization engine 404; visualizations 406; visualization models 408; data models 410; data sources 412; or the like.

In one or more of the various embodiments, data sources 412 represent a source of raw data, records, data items, or the like, that modeling engine 402 may employ to enable users to generate or modify data models, such as, data models 410.

In one or more of the various embodiments, data models, such as, data models 410 may be data structures, or the like, that provide one or more logical representations of the information stored in one or more data sources, such as, data source 412. In some embodiments, data models may include data objects that correspond to one or more portions of tables, views, or files in a data source. For example, in some embodiments, if data source 412 is a CSV file or a database, a data model, such as, data model 412 may be comprised of one or more data objects that may correspond to record fields in data source 412.

In one or more of the various embodiments, data models may be arranged to provide logical representations of a data source that may vary from an underlying data source. In some embodiments, this may include excluding one or more fields of the data source from the data model.

In some embodiments, a modeling engine, such as, modeling engine 402 may be employed to transform some or all of data sources 412 into data models 410. In some embodiments, the modeling engine may be arranged to employ or execute computer readable instructions provided by configuration information to determine some or all of the steps for transforming values in data sources into data models.

In one or more of the various embodiments, modeling engines may be arranged to assist users creating one or more data models that may be based on an underlying data in a data source.

Accordingly, in some embodiments, modeling engines may be arranged to recommend one or more visualizations (or visualization models) based on a working data model or one or more candidate data fields.

In one or more of the various embodiments, visualization engines, such as, visualization engine 404 may be arranged to employ visualization models, such as, visualization models 408 to determine the layout, styling, interactivity, or the like, for visualizations, such as, visualizations 406 that may be displayed to users. Also, in some embodiments, visualization engines may be arranged to employ data item values provided via data sources to populate visualizations with values based on a data model.

In one or more of the various embodiments, modeling engines may be arranged to receive one or more search expressions that may be employed for automatic data model generation. In some embodiments, users may be provided a user interface for providing search expressions that may include one or more keywords or one or more expressions. In response to the provided search expressions, modeling engines may be arranged to search through existing data models or data sources to identify one or more data fields that may match the provided search expressions. In some embodiments, modeling engine may be arranged to employ a variety of criteria to determine matching data fields. For example, for some embodiments, modeling engines may be arranged to compare search expressions to the values of different data fields in multiple data models to determine one or more data fields that may contain values that match the search expressions. Also, for example, other searching or matching strategies may be applied, such as, matching data field names or labels, matching data object names or labels in other data models, or the like.

In one or more of the various embodiments, modeling engines may be arranged to determine one or more metrics associated with data fields that match a search expression. In some embodiments, one or more of these metrics may be employed to provide context information associated with each match. Also, in some embodiments, one or more of the metrics may be used to sort, rank, or filter one or more data fields before displaying the search results to the user.

In one or more of the various embodiments, modeling engines may be arranged to support search expressions that may employ a variety of different query styles or query languages, such as, regular expressions, string matching, SQL-like expressions, logical operators (e.g., AND, OR, or the like), or the like. In some embodiments, modeling engines may be arranged to interpret search expressions using grammars, parsers, rules, or the like, provided via configuration information to account for local circumstances or local requirements.

In one or more of the various embodiments, modeling engines may be arranged to enable users to select one or more candidate data fields to automatically generate data models. In some embodiments, if a data field is provided, the modeling engine may be arranged to determine one or more recommended visualizations, one or more other recommended data fields, one or more queries or questions asked about data model that share the one or more candidate data fields, or the like, based on the one or more selected candidate data fields or a working data model. This information may be provided to assist users in determining if a candidate data fields should be included in a working data model.

In one or more of the various embodiments, modeling engines may be arranged to determine one or more visualization types that may be suitable for analyzing a provided data field. In some embodiments, the particular visualizations may be determined based on how the provided data field or similar data fields may be employed by other users. In one or more of the various embodiments, modeling engines may be arranged to determine some or all of the recommended visualizations based on the data type associated with a data field. For example, if the data field is used to store date information, the modeling engines may be arranged to recommend a calendar-style visualizations. Likewise, for example, if the data field is a used to store geographic values, such as, addresses, GPS coordinates, state names, or the like, the modeling engine may be arranged to recommend visualizations that include maps or map-like features.

In one or more of the various embodiments, modeling engines may be arranged to evaluate a user's working data model or selected data field to determine one or more other data fields that have been used together with the selected data field in other visualizations. Accordingly, in one or more of the various embodiments, modeling engines may provide one or more recommendations to select additional data field to include a working data model based on their use in other visualization or data models. For example, if the data field State is selected, other data fields, such as, Profit, Population, Sell Counts, or the like, may be recommended if the modeling engine determines that other visualizations use those fields in combination with the State data field.

In one or more of the various embodiments, initially user may be provided an 'empty' working data model. Alternatively, in some embodiments, users may be provided a working data model that includes one or more data objects or data fields. This may be because they have already added some data objects or data fields to the working data model. Or, in one or more of the various embodiments, modeling engines may be arranged to enable users to start with a working data model that is based on a data model that already includes data objects.

Accordingly, in one or more of the various embodiments, as data fields and visualizations may be selected, the data fields that may be included in the visualizations may be automatically added to a working data model. Thus, in some embodiments, users may be enabled to inspect various items, such as, the recommended visualizations, recommended fields, or the like, to determine candidate data fields may be added to a working data model.

In one or more of the various embodiments, data fields may be part of a data object. Accordingly, in some embodiments, modeling engines may be arranged to add the data objects that include selected data fields to the user's working data model.

In one or more of the various embodiments, modeling engines may be arranged to recommend visualizations or data fields based on a combination of data objects or data fields included in the user's working data model. In one or more of the various embodiments, as data fields or data objects are added to the working data model, the modeling engine may be arranged to dynamically adapt its recommendations based on the some or all of the data objects or data fields that have been included in the working data model.

In one or more of the various embodiments, modeling engines may be arranged to employ various evaluators or recommendation models to determine one or more data fields to recommend. In some embodiments, evaluators or recommendation models may be data structures that collect or include one or more of instructions, rules, conditions, machine learning classifiers, or the like, that modeling engines may execute to evaluate data fields or data objects to determine if they should be recommended to the user. In one or more of the various embodiments, the particular evaluators or recommendation models as well as one or more of their actions may be determined from configuration information to account for local requirements or local circumstances.

Also, in one or more of the various embodiments, modeling engines may be arranged to determine a popular data fields and a collection of associated visualizations that may be displayed to a user. In some embodiments, the popular data fields may be displayed in a tab panel on a user interface and thumbnails of the associated visualizations may be displayed in a display panel. Thus, rather than providing free form search expressions, users may be enabled to select one or more popular data fields directly from the tab panel in the user interface. In some embodiments, the popular data fields may be displayed absent the data model or other context. In some embodiments, this may enable users to focus on the popular data fields rather than being distracted by the structure or design of data models that include the popular data fields.

Accordingly, in one or more of the various embodiments, as users select popular data fields from the tab panel, modeling engines may be arranged to employ the selected data fields to automatically generate search expressions that may be employed to identify one or more visualizations for recommendation. Also, in some embodiments, modeling engines may be arranged to enable multiple popular data fields to be selected in the tab panel. Accordingly, in some embodiments, the collection of popular data fields may be employed in combination to determine one or more recommended visualizations.

Figure 5A:
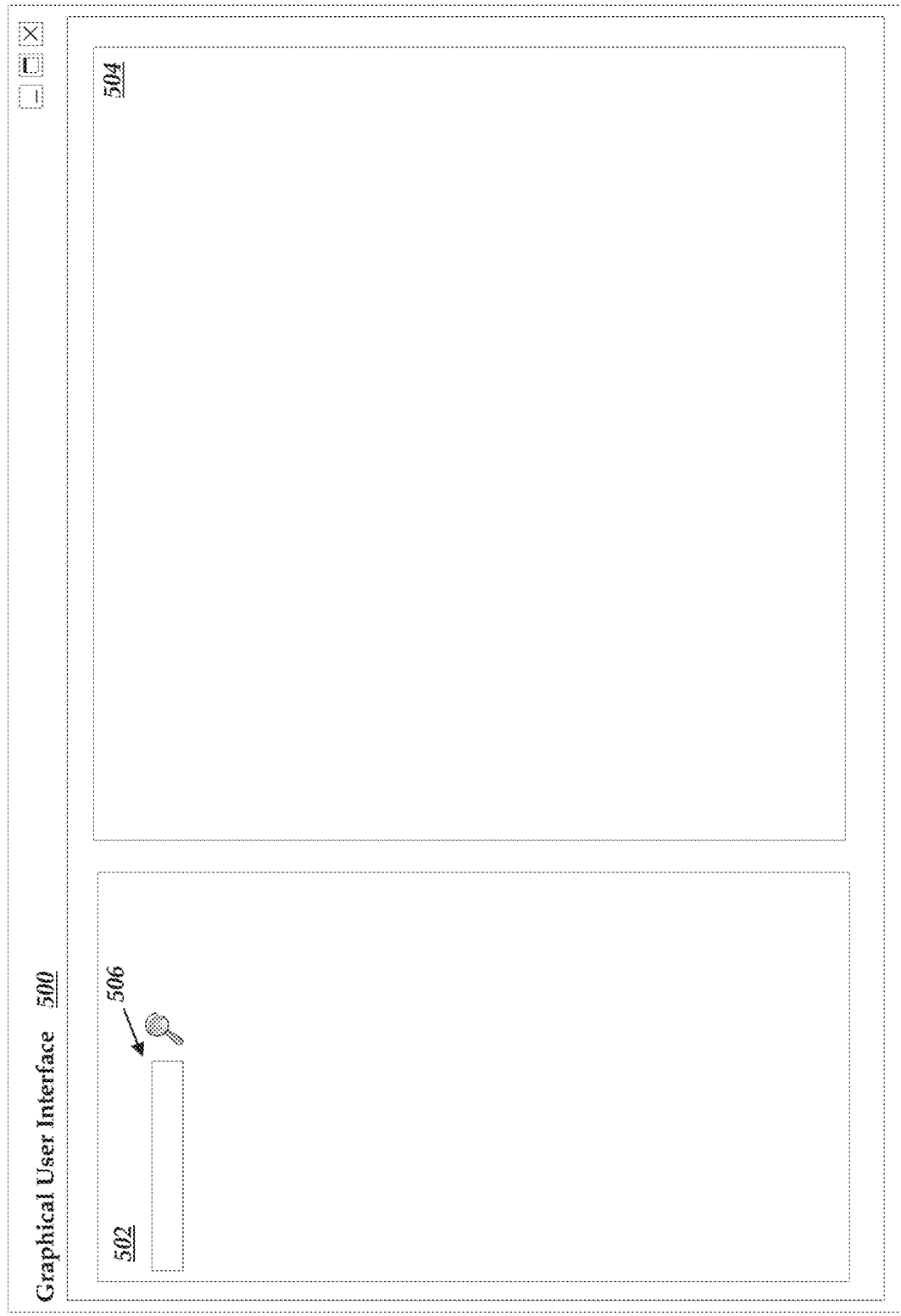
FIG. 5A illustrates a logical representation of a portion of a user interface for automatic data model generation in accordance with one or more of the various embodiments.

FIG. 5A illustrates a logical representation of a portion of user interface 500 for automatic data model generation in accordance with one or more of the various embodiments. In some embodiments, user interface 500 may be arranged to include one or more panels, such as, model panel 502, and display panel 504, or the like.

In one or more of the various embodiments, user interface 500 may be displayed on one or more hardware displays, such as, client computer displays, mobile device displays, or the like. In some embodiments, user interface 500 may be provided via a native application or as a web application hosted in a web browser or other similar applications. One of ordinary skill in the art will appreciate that for at least clarity or brevity many details common to commercial/production user interfaces have been omitted from user interface 500. Likewise, in some embodiments, user interfaces may be arranged differently than shown depending on local circumstances or local requirements, such as, display type, display resolution, user preferences, or the like. However, one of ordinary skill in the art will appreciate that the disclosure/description of user interface 500 is at least sufficient for disclosing the innovations included herein.

In some embodiments, model panels, such as, model panel 502, may be employed to display information associated with recommended data fields, search expressions, or the like. Also, in some embodiments, model panel 502 may be arranged to display the working data model. In this example, model panel 502 is empty except for user interface controls, such as, search control 506, that enable search expressions to be provided. In this example, model panel 502 is shown as empty to represent that a user has initiated a data modeling session but they have not entered any search expressions.

In one or more of the various embodiments, display panel 504 may be arranged to display visualizations or recommended visualizations. Accordingly, in some embodiments, as a user evaluates different data fields, thumbnails associated recommended visualizations, recommended data fields, or the like, may be displayed in display panel 504. Likewise, in some embodiments, if a user has selected a visualization from the available recommended visualizations, that visualization may be employed as the basis for a working visualization that may be displayed in display panel 504.

In one or more of the various embodiments, additional panels may be included in user interface 500, including, panels for modifying the marks used to represent values in visualizations, or the like. For example, in some embodiments, if the user is designing a data model that produces a visualization showing locations (points) on a map, additional fields, such as, size, revenue, profit, or the like, may be added as a color or size value that may be applied to the points in the map. For example, marks for locations on the map that are associated with more profit may be displayed using proportionately larger marks than locations associated with less profit.

Figure 5B:
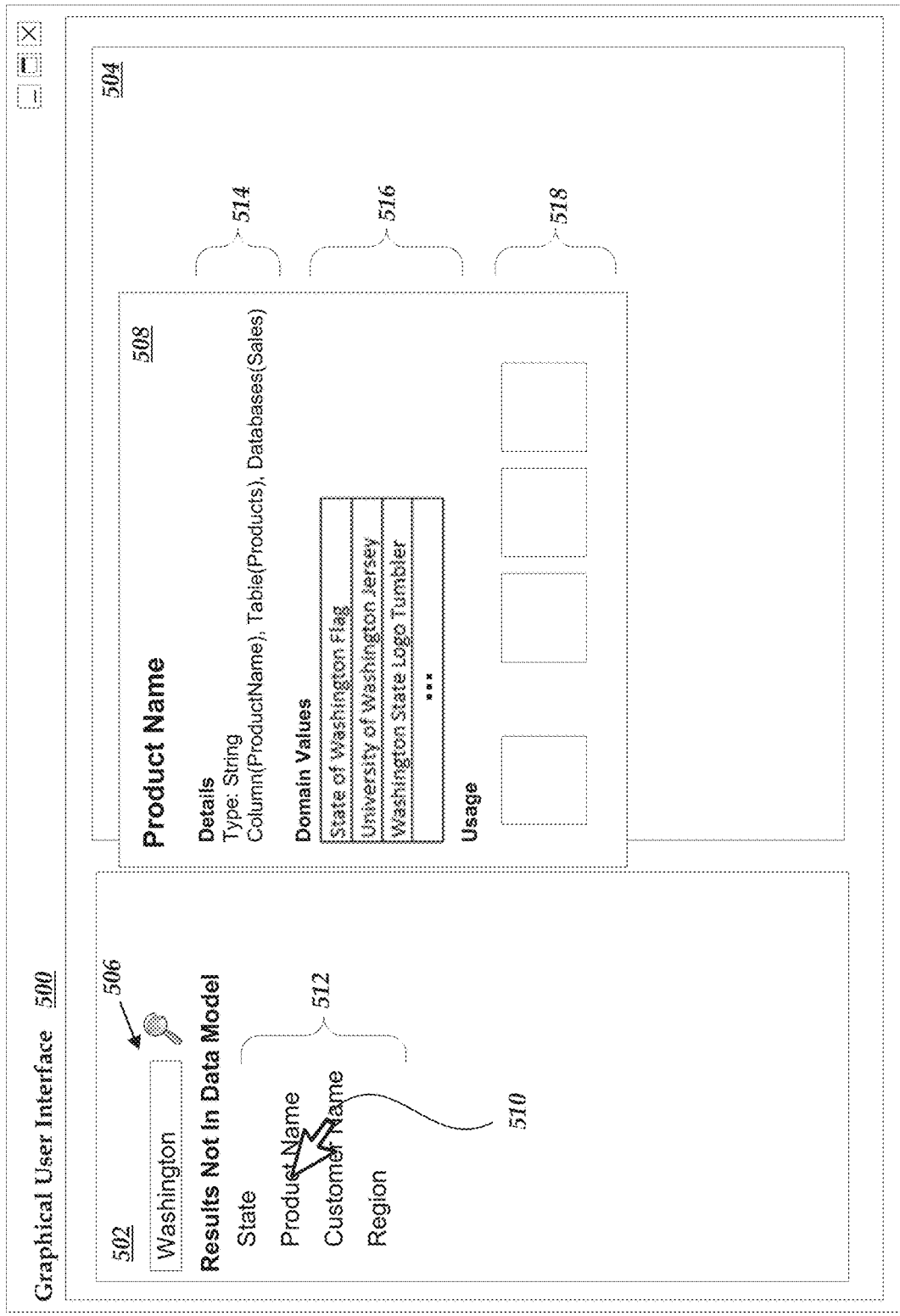
FIG. 5B illustrates a logical representation of a portion of a user interface for automatic data model generation in accordance with one or more of the various embodiments.

FIG. 5B illustrates a logical representation of a portion of user interface 500 for automatic data model generation in accordance with one or more of the various embodiments. For brevity and clarity, elements or behaviors of user interface 500 described above for FIG. 5A are not repeated here.

In this example, search control 506 includes a search expression that produced results 512. Accordingly, In some embodiments, the fields shown in results 512 represent data fields from various data models that have values that match the search expression 'Washington'. As shown in this example, there are four fields each that include values that match the search expression.

In one or more of the various embodiments, users may be enabled to immediately view candidate data fields that may be associated with the search expression. In some cases, one or more of the candidate data fields may be unknown to the user. Likewise, one or more of the candidate data fields may be considered by the user to be irrelevant.

In some embodiments, modeling engines may be arranged to generate or display field panels, such as, field panel 508 in response to user interaction with candidate data fields in results 512. In this example, the position of pointer 510 represents a user 'hovering' over a candidate data field label. Accordingly, in some embodiments, modeling engines may be arranged to generate field panels, such as, field panel 508 and populate them with information about the selected candidate data field. In this example, the selected candidate data field is 'Product Name' and the information displayed in field panel 508 shows information about that field, such as, data type (String), data source information (Column, Table, Databases), other values held by the selected data field, or the like. Also, in some embodiments, field panel 508 may include metrics or usage data associated with the selected candidate data field, such as, a count of the number of visualizations that include the data field in their data model, thumbnails of visualizations that use the data field, or the like.

In this example, field information 514 includes information, such as, data type, data source information, or the like. Also, in this example, domain information 516 shows other values of the data field. In some embodiments, modeling engines may be arranged to enable users to browse the domain information to view one or more values to help them determine if this data field represents the type of object that they may want to include in their working data model.

Figure 5C:
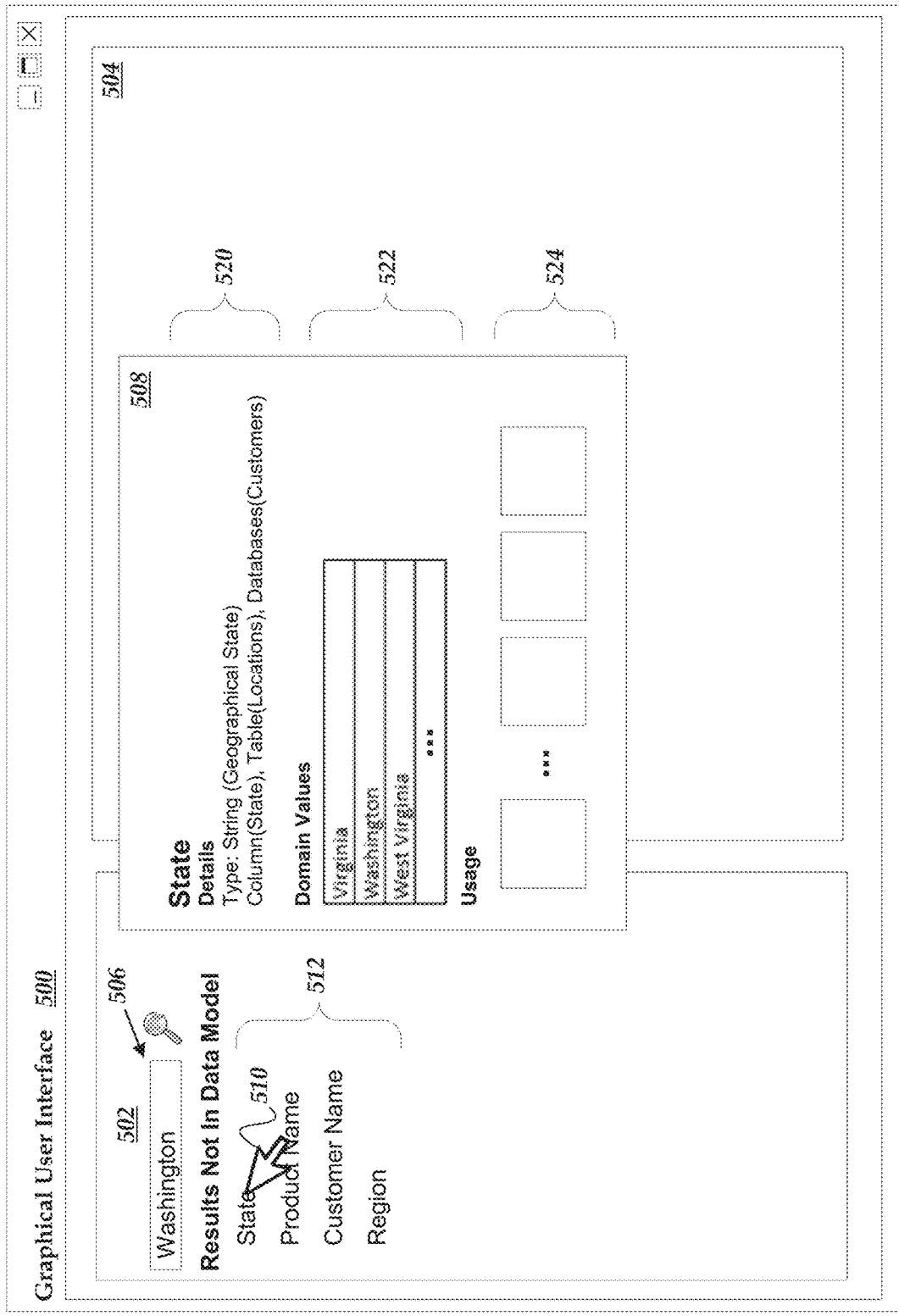
FIG. 5C illustrates a logical representation of a portion of a user interface for automatic data model generation in accordance with one or more of the various embodiments.

FIG. 5C illustrates a logical representation of a portion of user interface 500 for automatic data model generation in accordance with one or more of the various embodiments. For reasons of brevity and clarity, elements or behaviors of user interface 500 described above for FIG. 5A or 5B are not repeated here.

As described above, in some embodiments, modeling engines may be arranged to enable users to employ pointer 510 to select candidate data fields from results 512. In this example, pointer 510 may be considered to be hovering over the State data field in results 512. Accordingly, in some embodiments, the modeling engine may be arranged to display field panel 508 and populate it with values based on the State data field. Accordingly, in this example, field information 520 may indicate the State data field contains a String value that represents geographic states, from a table named 'Location' in a database named Customers. Also, in this example, domain information 522 indicates that values associated with the State data field include the names of states in the United States of America. And, in this example, usage information 524 may include information, such as, the number of visualizations that use a data model that includes the State data field as well as one or more thumbnails of visualizations that use the State data field.

Accordingly, in one or more of the various embodiments, modeling engines enable a user to rapidly evaluate if one or more of the candidate data fields that matched the search expression may be appropriate for including in their data model.

Figure 5D:
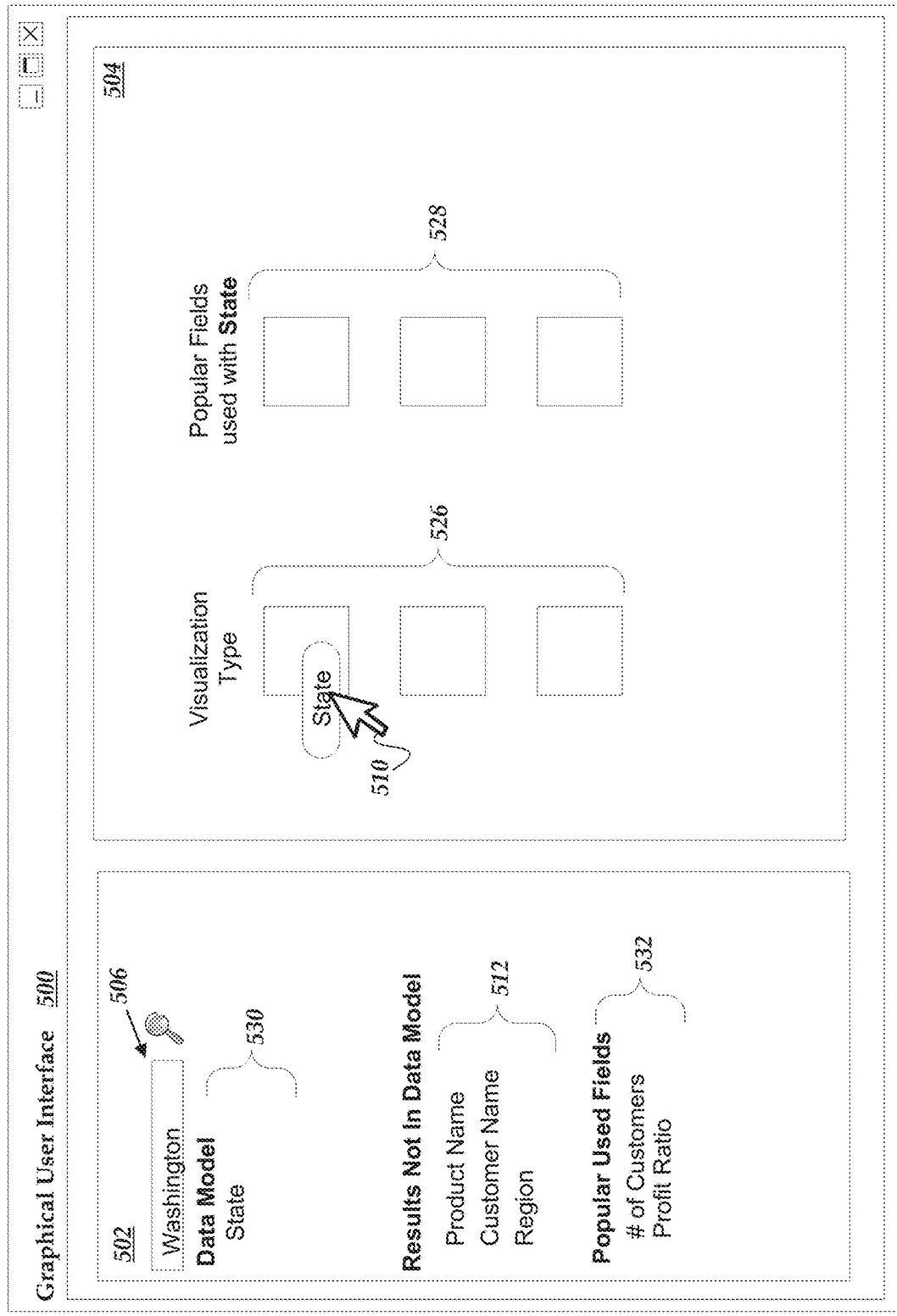
FIG. 5D illustrates a logical representation of a portion of a user interface for automatic data model generation in accordance with one or more of the various embodiments.

FIG. 5D illustrates a logical representation of a portion of user interface 500 for automatic data model generation in accordance with one or more of the various embodiments. For reasons of brevity and clarity, elements or behaviors of user interface 500 described above for FIG. 5A, 5B, or 5C are not repeated here.

In one or more of the various embodiments, modeling engines may be arranged to enable users to select a data field from various collections of fields, such as, results 512, popular fields 532, or data model 530.

In some embodiments, modeling engines may be arranged to automatically add fields from results 512, popular fields 532, or the like, to a working data model. In this example, working data model 530 may be displayed in model panel 502. In some embodiments, modeling engines may be arranged to add candidate data fields to the working data model as they are selected by users. Also, in one or more of the various embodiments, modeling engines may be arranged to remove data fields from the working data model as users deselect or otherwise remove them.

For example, in this example, the user has selected the State data field, as represented by pointer 510. In one or more of the various embodiments, if the user selected the State data field from results 512 (See, FIG. 5C), modeling engines may be arranged to remove the State data field from results 512 and add it to working data model 530 as shown here. In some embodiments, if the user releases or otherwise deselects the State data field, the modeling engine may be arranged to remove it from working data model 530 and return it to results 512. In some embodiments, if the State data field is associated with another field (not shown) or a visualization, modeling engines may be arranged to let the State data field remain in data model 530 rather than reverting it to results 512.

In one or more of the various embodiments, modeling engines may be arranged to determine one or more visualizations, visualization types, other data fields, or the like, to recommend to the user. In some embodiments, the recommendations may be based on one or more characteristics of the selected data fields, the working data model, other data models, usage metrics/history associated with other visualizations or data fields, or the like.

In one or more of the various embodiments, modeling engines may be arranged to employ recommendation models to determine visualizations, visualization types, other data fields, or the like, that should be recommended to the user. In one or more of the various embodiments, recommendation models may represent the data structures, rules, instructions, or the like, that a modeling engine may employ to determine which visualizations, visualization types, other data fields, or the like, to recommend to the user.

In one or more of the various embodiments, different categories of recommendations may be associated with different recommendation models. Accordingly, in some embodiments, recommendation models may be tuned based on the category of recommendations they may be directed towards. Also, in some embodiments, recommendation models may be tuned or otherwise adapted to meet the local requirements of organizations. For example, in some embodiments, an organization may deliberately exclude one or more visualizations, visualization types, other data fields, or the like, from being recommended to one or more users. For example, in some embodiments, one or more visualizations or data models may include or represent sensitive or restricted information that only a designated users may access. Accordingly, in some embodiments, recommendation models may be configured to include or exclude recommendations for a variety of reasons. Also, in some embodiments, new or additional recommendation models may be provided as different or new visualizations, data model, data sources, or the like, may be introduced. Thus, in one or more of the various embodiments, modeling engines may be arranged to employ recommendation models, recommendation rules, or the like, that may be provided via configuration information to account for local requirements or local circumstances.

In this example, the modeling engine may be arranged to determine visualization types 526 and recommended fields 528 based on one or more recommendation models that evaluate one or more characteristics of the selected data field (e.g., State), the working data model, the working visualization, other data models, other visualizations, or the like.

In this example, visualization types 526, may include thumbnail views of different visualization types that may be recommended for visualizing the State data field. For example, in one or more of the various embodiments, visualization types 526 may include thumbnail views of various visualizations, such as, filled (with color) maps, other maps, lists/tables, or the like.

Likewise, in this example, recommended fields 528, may include thumbnail views of visualizations that may be associated with data fields that may be recommended for including in data models or visualizations that include the State data field. For example, in one or more of the various embodiments, recommended fields 528 may include one or more thumbnail views of various visualizations that include a corresponding recommended data field, such as, Profit, Profit Ratio, Order Count, Items Sold, or the like. In one or more of the various embodiments, one or more of the recommended data fields may be from different data models or different data sources.

In some embodiments, recommendations may include text based descriptions or annotations that support the recommendation. In some embodiments, recommendation models may be arranged to provide recommendation information that may include, text, images, metrics, or the like. Accordingly, modeling engines may be arranged to display some or all of the recommendation information in the display panel. Further, in some embodiments, modeling engines may be arranged to employ user interface layout, styling, user interface behaviors, or the like, provided via configuration information to enable the display appearance to be adapted to local circumstances or local requirements. For example, visualization types 526 or recommended fields 528, or the like, may be displayed with interactive controls (e.g., scroll bars, or the like), fonts, colors, or the like, determined based on configuration information.

Figure 5E:
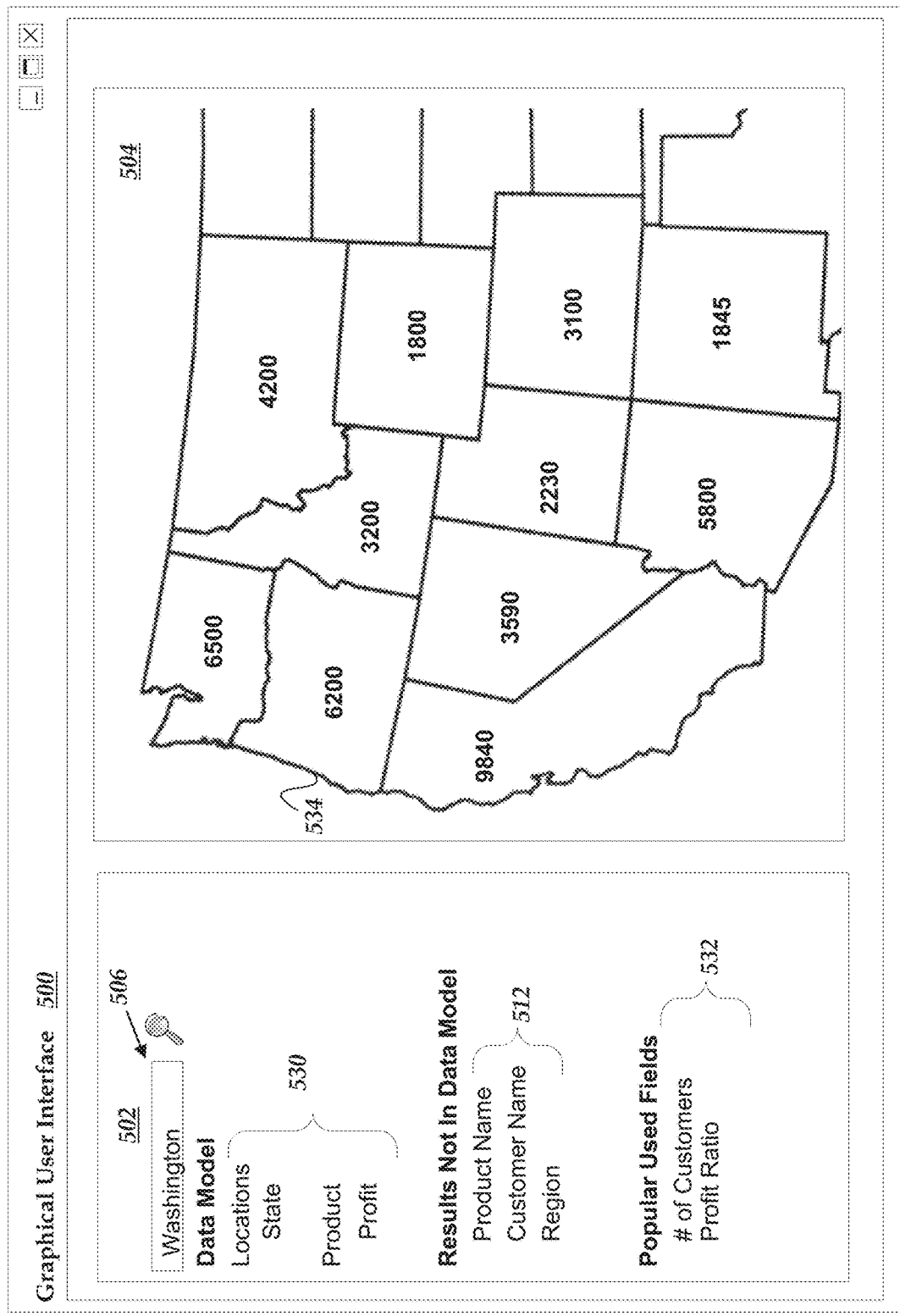
FIG. 5E illustrates a logical representation of a portion of a user interface for automatic data model generation in accordance with one or more of the various embodiments.

FIG. 5E illustrates a logical representation of a portion of user interface 500 for automatic data model generation in accordance with one or more of the various embodiments. For reasons of brevity and clarity, elements or behaviors of user interface 500 described above for FIG. 5A, 5B, 5C, or 5D are not repeated here.

In this example, carrying over from FIG. 5D, the State data field has been 'dropped' into one of the recommend visualization types. Accordingly, in one or more of the various embodiments, the State data field was added to working data model 530 and working visualization 534 was generated using a map visualization type (representing the selected visualization type). In this example, a first instance of working visualization 534 displays a map of the United States showing its states. Here, in this example, the modeling engine may be configured to display a map of geographic regions (e.g., states, provinces, counties, countries, or the like) as a default response to being initialized with a data field representing geographic regions. In some embodiments, the default or initial appearance of visualizations may depend on the data model or working data model. Accordingly, in one or more of the various embodiments, the particular defaulting rules or assumptions employed to initialize visualizations may be determined via rules, instructions, or the like, provided via configuration information.

In one or more of the various embodiments, modeling engines may be arranged to enable users to add more data fields to their working data model. In some embodiments, modeling engines may be arranged to continuously update the working data model as users include or remove data fields. Further, in some embodiments, users may be enabled to change visualization types, or the like, continuously as well. Thus, in some embodiments, modeling engines may be arranged to update working data models, working visualizations, recommendation information, or the like, based on user interactions or user inputs.

In this example, the Profit data field has been selected from popular fields 532 and added to working data model 530. Accordingly, in one or more of the various embodiments, the modeling engine may be arranged to automatically update working visualization 534, recommendation information, or the like, based on the characteristics of the added fields or the characteristics of the modified working data model. In this example, for some embodiments, adding the Profit data field to working data model 530 has triggered the modeling engine to update working visualization 534 to show the amount profit that may be associated with each US State. Note, this default behavior may be possible because there is a relationship between Profit and States that the modeling engine may identify from the data models or data sources that are available.

In one or more of the various embodiments, if a data field may be added to a working data model, its containing data object may be added to the working data model rather than just the individual data field. In some embodiments, some or all of the additional data fields in the data objects added to the working data model may be displayed in the model panel. In some embodiments, one or more user interface controls (not shown) may be provided to enable users to show or hide some or all of the data field in the data objects shown in the model panels. In this example, the modeling engine may be configured to hide data fields that are not explicitly shown in the working visualization.

Figure 6:
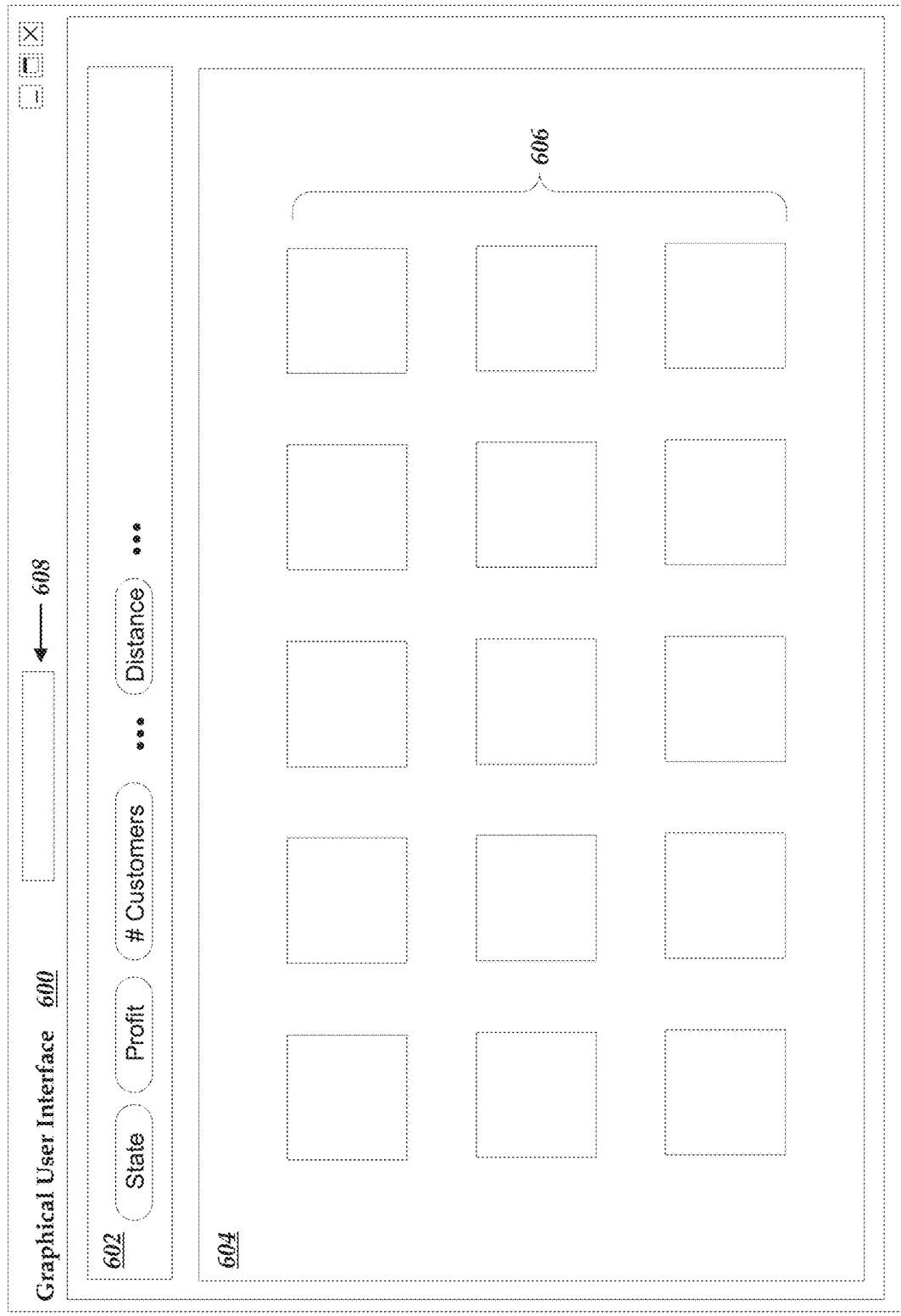
FIG. 6 illustrates a logical representation of a portion of a user interface for automatic data model generation in accordance with one or more of the various embodiments.

FIG. 6 illustrates a logical representation of a portion of user interface 600 for automatic data model generation in accordance with one or more of the various embodiments. For reasons of brevity and clarity, elements or behaviors of user interface 500 described above for FIG. 5A, or the like, are not repeated here.

In some embodiments, user interfaces, such as, user interface 600 may be arranged to include a tab panel, such as, tab panel 602, display panel 604, or the like.

In one or more of the various embodiments, modeling engines may be arranged to provide tab panels, such as, tab panel 602, that may include interactive labels or buttons that represent one or more popular or recommended data fields.

In one or more of the various embodiments, modeling engines may be arranged to employ one or more recommendation models to select the data fields that may be represented in tab panels. As described above, recommendation models (not shown) represent the data structures, codes, instructions, classifiers, evaluators, or the like, that may be employed by modeling engines to determine one or more data fields (the popular data fields) to include in tab panels, such as, tab panel 602.

Also, in one or more of the various embodiments, modeling engines may be arranged to determine one or more visualizations, such as, visualizations 606 that may be associated with the popular data fields included in tab panels. In some embodiments, the determined visualizations may be displayed using thumbnail representations of the visualizations or visualization types being recommended.

In some embodiments, users may be enabled to interactively select popular data fields from tab panels or select visualizations from the display panel. in some embodiments, as data fields are selected, the modeling engine may be arranged to employ the selected data fields as a filter to include or exclude visualizations from visualizations 606. For example, if a user first selects State data field in tab panel 602, the modeling engine may be arranged to exclude visualizations that are not associated with State data field from visualizations 606. Likewise, in this example, if the user selects additional fields, the modeling engine may be arranged to employ the entire collection of selected data field as a filters to exclude or include visualizations shown in visualizations 606. Note, while not shown here, tab panels, such as, tab panel 602 may include additional/alternative user interface controls (e.g., toggle buttons, or the like) that enable the effect of the filter to be reversed. Also, in some embodiments, additional filter information may be provided as search expressions via search control 608, or the like.

Further, in one or more of the various embodiments, modeling engines may be arranged to enable users to select one or more visualizations from visualizations 606. Accordingly, in some embodiments, the selected visualizations may be employed as filter that is applied to the data fields shown in tab panels. For example, if a user selects a visualization from visualizations 606, the modeling engine may be arranged to remove data fields from tab panel unless they have been included in data models associated with the selected visualizations. In some embodiments, as additional visualizations may be selected, the data fields associated with those selected visualizations may be added to the tab panel.

Thus, in some embodiments, users may be enabled to rapidly and intuitively explore data models, data fields, visualizations, or the like, without having deep knowledge or understanding in the underlying data sources, data models, or the like.

In some embodiments, modeling engines may be arranged to enable a visualization selected from visualizations 606 to be selected or activated for automatic data model generation as described for FIG. 5A-5E, or the like.

Generalized Operations

FIGS. 7-10 represent generalized operations for automatic data model generation in accordance with one or more of the various embodiments. In one or more of the various embodiments, processes 700, 800, 900, and 1000 described in conjunction with FIGS. 7-10 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-10 may be used for automatic data model generation in accordance with at least one of the various embodiments or architectures such as those described in conjunction with FIGS. 4-6. Further, in one or more of the various embodiments, some or all of the actions performed by processes 700, 800, 900, and 1000 may be executed in part by modeling engine 322, visualization engine 324, or the like, running on one or more processors of one or more network computers.

Figure 7:
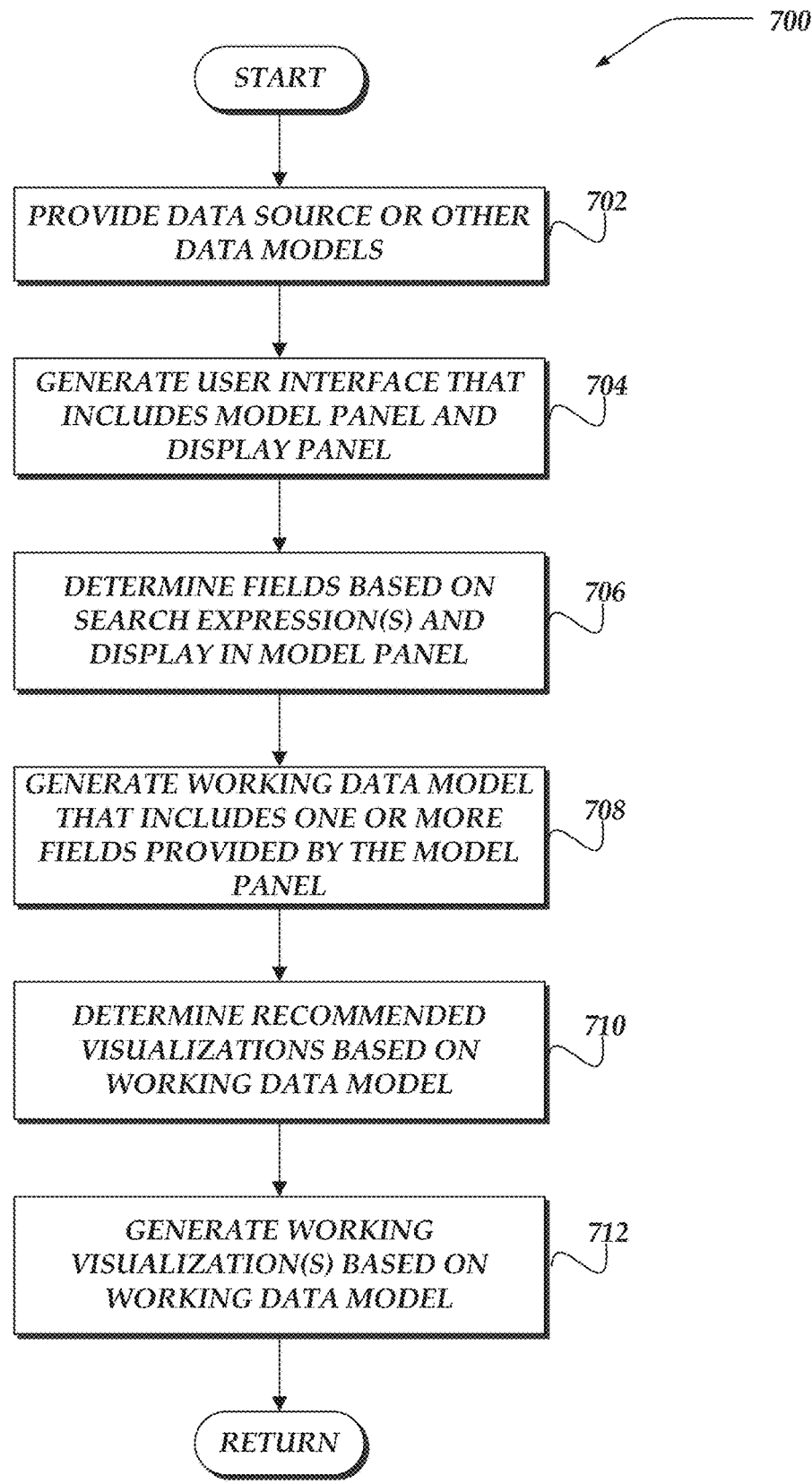
FIG. 7 illustrates an overview flowchart of a process for automatic data model generation in accordance with one or more of the various embodiments.

FIG. 7 illustrates an overview flowchart of process 700 for automatic data model generation in accordance with one or more of the various embodiments. After a start block, at start block 702, in one or more of the various embodiments, a data source or one or more data models may be provided to a modeling engine. In one or more of the various embodiments, organizations may have many data models based on various data sources that have been used for visualizations. In one or more of the various embodiments, these data models or data sources may be provided by different departments or authors. In some cases, some or many of these data models may be unknown to other users. Accordingly, in some embodiments, providing access to other data models from the organization may enable modeling engines to generate recommendations regarding which data fields or data objects to include in their data model.

In one or more of the various embodiments, modeling engines may be configured to restrict one or more data sources or data models to certain users or user groups. For example, some data models or data sources may be restricted to employees that are in specific departments or in specific roles. Accordingly, in some embodiments, modeling engines may be arranged to employ rules, instructions, access lists, or the like, provided via configuration information to determine which users may be allowed to access a given data model or data source.

At block 704, in one or more of the various embodiments, modeling engines may be arranged to generate user interfaces that may include one or more model panels, one or more display panels, or the like.

In one or more of the various embodiments, user interfaces may include a variety of different panels, including a model panel for displaying information, such as, candidate data fields, search results, working data models, or the like.

In one or more of the various embodiments, display panels may be employed to displayed thumbnails associated with recommended visualizations or visualization types, additional fields, or the like. Also, in some embodiments, modeling engines may be arranged to employ a display panel to display the working visualization while it or the working data model are being designed.

In one or more of the various embodiments, the particular layout of the user interface or panels in the user interface may vary depending on local preferences. Accordingly, in some embodiments, modeling engines may be arranged to employ templates, rules, layout information, styling, or the like, provided via configuration information to determine the layout, appearance, or styling of the user interfaces.

At block 706, in one or more of the various embodiments, modeling engines may be arranged to determine one or more data fields based on one or more search expressions that may be displayed in a model panel on the user interface. As described above, modeling engines may be arranged to employ various evaluators or recommendation models to determine one or more candidate data fields based on the search expressions.

At block 708, in one or more of the various embodiments, modeling engines may be arranged to generate a working data model that includes one or more data fields provided by the model panel. As candidate data fields may be selected, modeling engines may add the selected candidate data fields and their associated data objects to the working data model. In this context, the working data model is a data model that the user is actively modeling.

At block 710, in one or more of the various embodiments, modeling engines may be arranged to determine one or more recommended visualizations, visualization types, other data fields, or the like based on the working data model. As the working data model is developed, modeling engines may be arranged to automatically evaluate other data models, other visualizations, other queries, or the like, to provide one or more recommendations for including in the working data model. In one or more of the various embodiments, modeling engines may recommend one or more of visualization types, visualizations, additional fields to include, additional queries, or the like, based on the working data model and previously authored visualizations or data models.

At block 712, in one or more of the various embodiments, modeling engines may be arranged to generate working visualizations based on the working data model. In one or more of the various embodiments, as users interact with the working data model, they may select or activate one or more working visualizations. In some embodiments, users may select a working visualization from or based on one or more of the visualizations or visualization types recommended by the modeling engine. Alternatively, in some embodiments, a user may select a working visualization or visualization type via another search tool or search catalog.

Next, in one or more of the various embodiments, control may be returned to a calling process.

Figure 8:
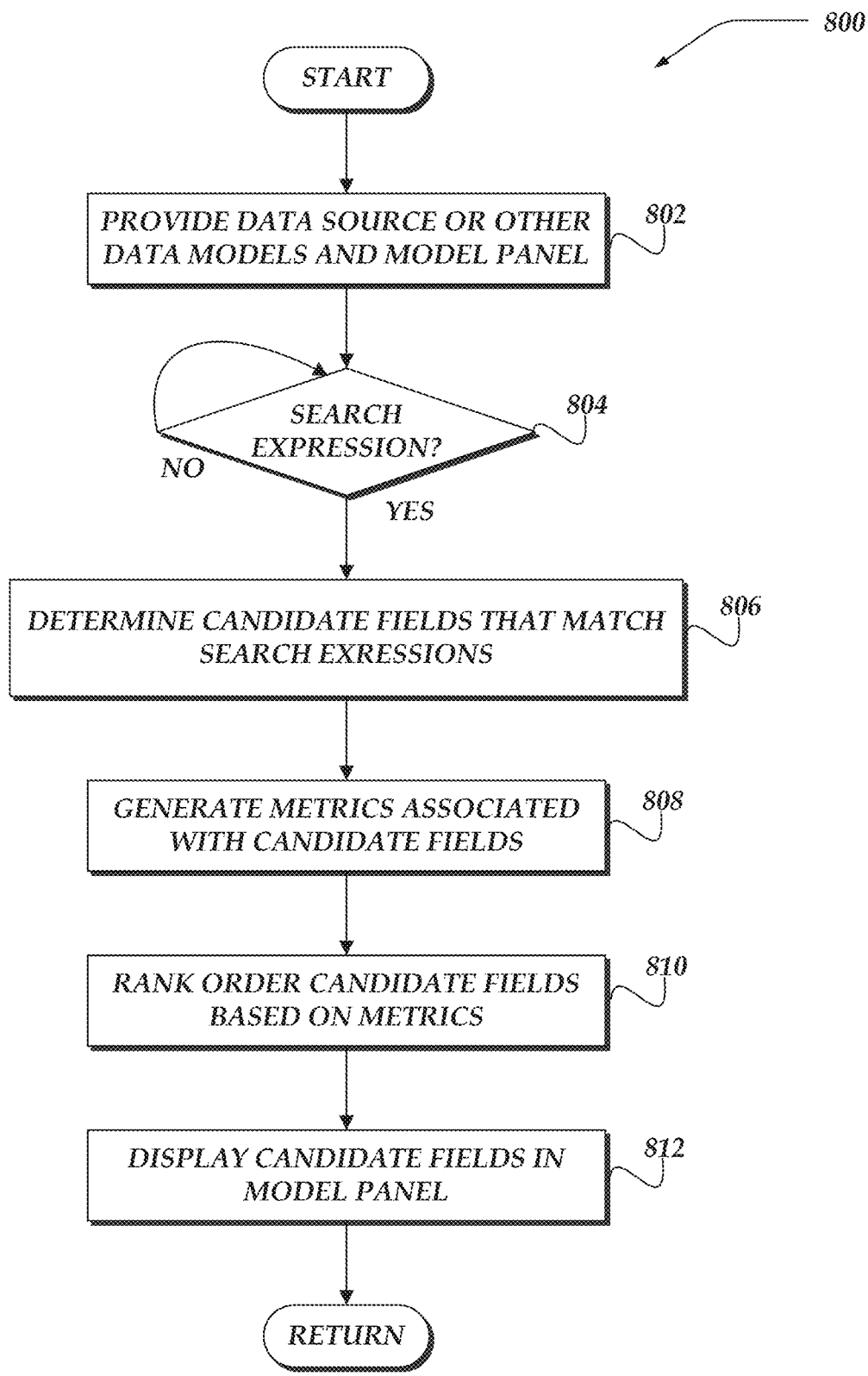
FIG. 8 illustrates a flowchart of a process for automatic data model generation in accordance with one or more of the various embodiments.

FIG. 8 illustrates a flowchart of process 800 for automatic data model generation in accordance with one or more of the various embodiments. After a start block, at start block 802, in one or more of the various embodiments, data sources, one or more data models, model panels, display panels, or the like, may be provided or displayed in a user interface.

In one or more of the various embodiments, modeling engines may be arranged to provide one or more search controls that enable users to provide one or more search expressions that may be employed for identifying candidate data fields that may be part of other data models.

In one or more of the various embodiments, modeling engines may be arranged to provide one or more APIs that enable external services or applications to submit search expressions or to receive search result information.

At decision block 804, in one or more of the various embodiments, if a search expression may be provided, control may flow to block 806; otherwise, control may loop back to decision block 804. In one or more of the various embodiments, modeling engines may be arranged to support a variety of query types or query languages. In some embodiments, modeling engines may be arranged to support compound search expressions that may be comprised of two or more other search expressions.

In one or more of the various embodiments, modeling engines may be arranged to support search expressions that may be based on a variety of query languages, formal grammars, or the like. For example, in some embodiments, modeling engines may be arranged to support SQL-like search expressions, regular expressions, Boolean expressions, custom query languages, or the like. Accordingly, in one or more of the various embodiments, modeling engines may be arranged to employ rules, grammars, parsers, or the like, provided via configuration information to account for local circumstances or local requirements.

At block 806, in one or more of the various embodiments, the modeling engine may be arranged to determine one or more candidate data fields that match the search expressions. In one or more of the various embodiments, modeling engines may be arranged to parse or interpret the search expressions into one or more query actions that may be executed to determine one or more data fields.

In one or more of the various embodiments, modeling engines may be arranged to determine one or more data fields in other data models based on match of the values associated with the data fields and the search expressions. For example, in some embodiments, if a search expression is the word 'Washington', the modeling engines may determine the set of data fields that have values that include the word 'Washington'. Likewise, for example, a search expression that includes 'Washington OR Oregon' may be employed to identify data fields that have values that may match Washington or Oregon. And, for example, in some embodiments, a search expression based on regular expressions, such as, '^Washing.*', or the like, may be employed to identify data fields that have values that begin with 'Washing' such as a data field with a value of 'Washington' and a data field with a value of 'Washing Machine'. Also, in one or more of the various embodiments, modeling engines may be arranged to support custom search expression languages or grammars.

At block 808, in one or more of the various embodiments, the modeling engine may be arranged to generate one or more metrics associated with the one or more candidate data fields. In one or more of the various embodiments, modeling engines may be arranged to determine or generate one or more metrics that may provide context that enables users to determine if a candidate data field should be added to a working data model.

In one or more of the various embodiments, modeling engines may be arranged to provide metrics, such as, number of visualizations that include or reference the data field, data source information (e.g., column name, table name, database name, or the like), or the like. In some embodiments, other metrics may include date since last used or viewed, number of data models that include or reference the data field, or the like.

At block 810, in one or more of the various embodiments, the modeling engine may be arranged to rank order the candidate data fields based on the one or more metrics.

In one or more of the various embodiments, modeling engines may be arranged to include one or more evaluators or recommendation models that may be executed to provide ranking values or ranking scores. In one or more of the various embodiments, ranking scores may be implicit or based on other metrics, such as, number of views in the last week, or the like. Accordingly, in some embodiments, if a ranking score is associated with a candidate data field, that score may be employed to rank the candidate data field against other candidate data fields. Alternatively, in one or more of the various embodiments, modeling engines may be arranged to rank and sort the candidate data fields directly based on their associated metrics or other characteristics of associated with candidate data fields.

At block 812, in one or more of the various embodiments, the modeling engine may be arranged to display one or more candidate fields in the model panel. In one or more of the various embodiments, modeling engines may display some or all of the determined candidate data fields in the user interface. In some embodiments, the candidate data fields may be displayed in a model panel.

In one or more of the various embodiments, modeling engines may be arranged to exclude some or all candidate data fields from the display if they are ranked below a threshold rank value. Also, in one or more of the various embodiments, additional criteria separate from the ranking may be employed to determine which candidate data fields may be displayed or which candidate data fields may be excluded from display. For example, modeling engines may be configured to exclude candidate data fields that remain unused for over 120 days, or the like.

Next, in one or more of the various embodiments, control may be returned to a calling process.

Figure 9:
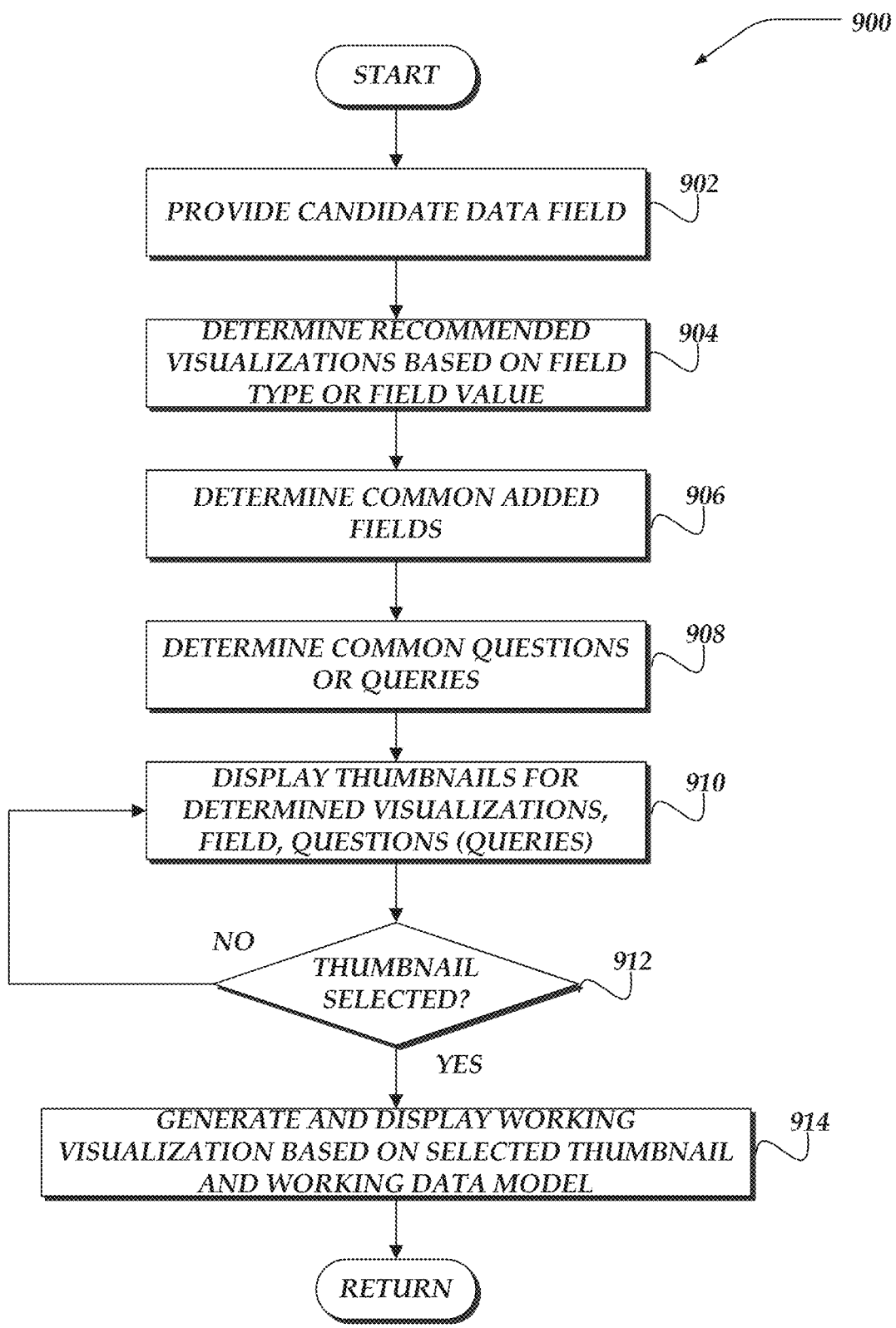
FIG. 9 illustrates a flowchart of a process for automatic data model generation in accordance with one or more of the various embodiments.

FIG. 9 illustrates a flowchart of process 900 for automatic data model generation in accordance with one or more of the various embodiments. After a start block, at start block 902, in one or more of the various embodiments, a candidate data field may be provided. As described above, modeling engines may be arranged to enable one or more data fields displayed in the model panel to be evaluated for including in the working data model.

At block 904, in one or more of the various embodiments, the modeling engine may be arranged to determine one or more recommended visualizations based on the selected data field. As described above, the modeling engine may be arranged to perform one or more actions to determine one or more visualizations or visualization types to recommend.

In one or more of the various embodiments, modeling engines may be arranged to employ one or more recommendation models to determine the set of recommended visualizations.

In one or more of the various embodiments, the data type of the selected data field may be associated with particular visualization types based on static rules or defaults. Also, in one or more of the various embodiments, one or more of the visualization types may be determined based on the selected data field or other data fields that may be present in the working data model, if any.

At block 906, in one or more of the various embodiments, the modeling engine may be arranged to determine one or more common or popular data fields that may be recommended for inclusion in the working data model. As described above, the modeling engine may be arranged to perform one or more actions to determine one or more data fields to recommend.

In one or more of the various embodiments, modeling engines may be arranged to employ one or more recommendation models to determine the set of recommended data fields.

In one or more of the various embodiments, one or more of the recommended data fields may be determined based on the selected data field or other data fields that may be present in the working data model, if any.

At block 908, in one or more of the various embodiments, the modeling engine may be arranged to determine one or more common questions or common queries based on the provided data field or the working data model. Similar to determining recommended visualizations or recommended data fields, modeling engines may be arranged to employ one or more recommendation models to determine one or more questions or queries that may be of interest of a user.

At block 910, in one or more of the various embodiments, the modeling engine may be arranged to display one or more thumbnails for the recommended visualizations, visualization types, recommended popular data fields, recommended questions or queries, or the like.

At decision block 912, in one or more of the various embodiments, if a thumbnail may be selected, control may flow to block 914; otherwise, control may loop back to block 910. In one or more of the various embodiments, users may be enabled to select one or more of the thumbnails. In some cases, the selection may be made by selecting a data field from a model panel and associating it with one of the thumbnails. For example, a user interface may enable users to drag-and-drop a data field from a working data model to one or more of the recommendation thumbnails.

At block 914, in one or more of the various embodiments, the modeling engine may be arranged to generate and display a working visualization based on the selected thumbnail and the working data model. In one or more of the various embodiments, if the modeling engine has been provided enough information to generate a working visualization, it may do so. In some embodiments, providing a working data model, and associating a data field with a recommendation thumbnail may provide sufficient information to generate and display a working visualization.

Figure 10:
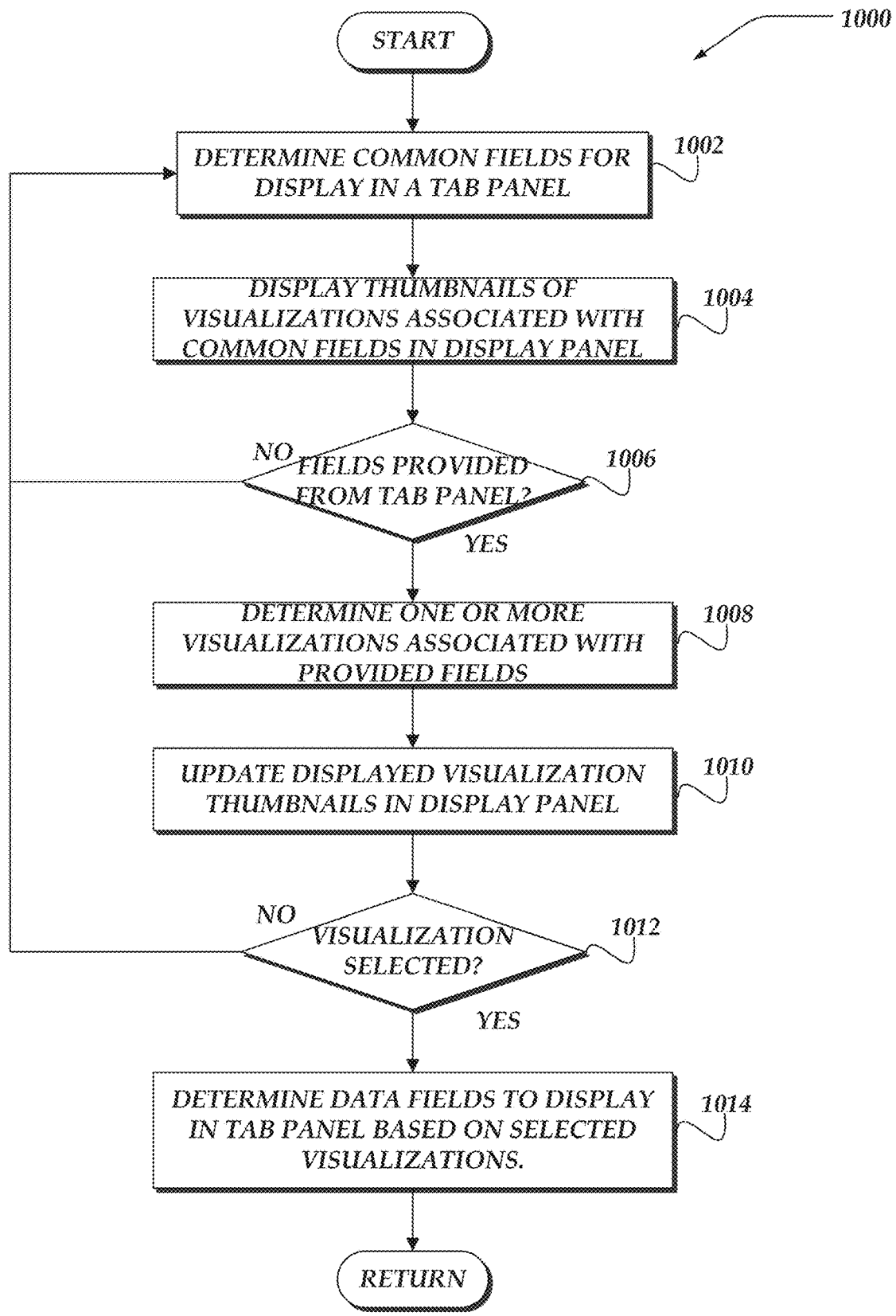
FIG. 10 illustrates a flowchart of a process for automatic data model generation in accordance with one or more of the various embodiments.

FIG. 10 illustrates a flowchart of process 1000 for automatic data model generation in accordance with one or more of the various embodiments. After a start block, at start block 1002, in one or more of the various embodiments, modeling engines may be arranged to display one or more common/popular data fields (hereinafter referred to as popular data fields) in a tab panel on a user interface.

In one or more of the various embodiments, modeling engines may be arranged to employ one or more evaluators or recommendation models to identify one or more popular fields that may be displayed in the tab panel. In some embodiments, 'popularity' may be determined based on one or more metrics or characteristics, such as, the number of data models, visualizations, or the like, that may include or reference a data field. Likewise, in some embodiments, popularity may be determined based in part on the number of times users employ or view visualizations that include or reference a given data field.

In some embodiments, if a working data model may be available or referenced, modeling engines may be arranged to employ one or more characteristics of the working data model to determine one or more of the popular data fields.

In one or more of the various embodiments, the popular data fields may be displayed in the tab panel using interactive user interface controls that enable users to select one or more of the popular data fields from the tab panel. In some embodiments, such user interface controls may include buttons, list boxes, or the like.

In one or more of the various embodiments, modeling engines may be arranged to employ rules or instructions provided via configuration information to determine the evaluators or recommendation models used to identify popular data fields. Likewise, in some embodiments, modeling engines may be arranged to determine the sort order, popularity threshold values, tab panel layout, or the like, based on configuration information to account for local circumstances or local requirements.

At block 1004, in one or more of the various embodiments, modeling engines may be arranged to display one or more thumbnails of visualizations associated with the one or more popular data fields in a display panel. In one or more of the various embodiments, modeling engines may be arranged to determine one or more visualizations that employ data models that include or reference one or more of the popular fields. Also, in one or more of the various embodiments, if there may be many associated visualizations, modeling engines may be arranged to rank the visualizations based on various criteria. Accordingly, in one or more of the various embodiments, visualizations that may be below a given rank may be excluded from the display. For example, in some embodiments, visualizations that include or reference two or more data fields may be considered for display over visualizations that include of reference just one of the popular data fields.

Accordingly, in one or more of the various embodiments, modeling engines may be arranged to employ one or more recommendation models to determine which visualizations should be included in the set of displayed visualization thumbnails.

In one or more of the various embodiments, modeling engines may be arranged to determine which visualizations to include based on rules or instructions provided via configuration information to account for local requirements or local circumstances.

At decision block 1006, in one or more of the various embodiments, if one or more data fields may be selected from the tab panel, control may flow to block 1008; otherwise, control may loop back to block 1004. In some embodiments, as popular data fields may be selected, modeling engines may be arranged to alter the appearance or styling of the popular data fields, the tab panel, or the like, to emphasize the selected popular data fields over the non-selected data fields. For example, selected data fields may be moved to one side of the tab panel or their appearance may be changed to indicate that they have been selected.

At block 1008, in one or more of the various embodiments, modeling engines may be arranged to determine one or more visualizations associated with the provided data fields. Similar to actions described for block 1004, modeling engines may be arranged to select one or more visualizations based on the currently selected popular data fields. In one or more of the various embodiments, the selected popular data fields may be applied as a filter to determine one or more visualizations to display. Also, in some embodiments, the selected popular data fields may be employed as a filter to exclude to one or more visualizations.

In one or more of the various embodiments, modeling engines may be arranged to determine one or more visualizations that include or reference the selected popular data fields.

At block 1010, in one or more of the various embodiments, modeling engines may be arranged to update which visualizations may be displayed in the display panel. In one or more of the various embodiments, modeling engines may be arranged to automatically update the recommended visualizations to include one or more visualizations that may be associated with the one or more popular data fields in the filter. Likewise, in some embodiments, the one or more visualizations that may be unassociated with the one or more popular data fields in the filter may be excluded from display.

At decision block 1012, in one or more of the various embodiments, if a visualization may be selected, control may flow to block 1014; otherwise, control may loop back to 1002. In one or more of the various embodiments, users may be enabled to select a visualization from the displayed visualization thumbnails.

At block 1014, in one or more of the various embodiments, modeling engines may be arranged to determine one or more data fields to display in the tab panel based on one or more selected visualizations.

In one or more of the various embodiments, as visualizations may be selected, modeling engines may determine one or more data fields that may be included or referenced by data models associated with the selected visualizations.

In one or more of the various embodiments, modeling engines may be arranged to employ user interface features or styling to indicate if a data field in the tab panel may be associated with one or more of the selected visualizations.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data visualizations using one or more processors that execute instructions to perform actions, comprising:
   providing a data source, a model panel, a tab panel, and a display panel, wherein the data source is associated with one or more data models that each include a plurality of data fields; and
   in response to a provided search expression, performing further actions, comprising:
      determining one or more candidate data fields based on the search expression and the one or more data models, wherein one or more values associated with each candidate data field matches the provided search expression, and wherein the one or more candidate data fields are displayed in the model panel;
      generating a working data model based on a portion of the one or more candidate data fields, wherein the portion of the one or more candidate data fields is included in the working data model;
      determining one or more portions of one or more visualizations for recommendation based on one or more recommendation models and the working data model, wherein the one or more portions of the one or more visualizations that are recommended include one or more shared data fields that are included in the working data model and one or more recommended visualizations, and wherein the one or more recommended visualizations are rendered as one or more thumbnail images of the one or more recommended visualizations that are listed in the display panel; and
      in response to selection of a thumbnail image of a recommended visualization listed in the display panel and selection of one or more data fields of the working data model, generating a working visualization based on the selected thumbnail image of the recommended visualization listed in the display panel and the working data model, wherein the one or more data fields included in the working data model are associated with the working visualization;
   in response to updating the working data model to include one or more other candidate data fields, updating one or more of the one or more candidate data fields, the one or more recommended visualizations, or the working visualization based on the updated working data model; and
   updating the display of the one or more thumbnail images, in the display panel, to include one or more other thumbnail images rendered for one or more other visualizations based on one or more popular data fields displayed in the tab panel, wherein the one or more popular fields are updated in the tab panel based on each selection of each thumbnail image in the display panel.

2. The method of claim 1, wherein determination of the one or more recommended visualizations, further comprises:
   basing the determination on their association with one or more data fields in the working model and another data field that is included in one or more other visualizations, wherein the one or more recommended visualizations are listed in the display panel; and
   in response to a selection of one recommended visualization, updating the updated working model to include the other data field.

3. The method of claim 1, further comprising:
   determining one or more characteristics associated with the one or more candidate data fields, wherein the one or more characteristics include one or more of a count of a number of visualizations that reference the one or more candidate data fields, data source information associated with the one or more candidate data fields, or a sample of values of the one or more candidate data fields; and displaying one or more portions of the one or more characteristics for each selection of the one or more candidate data fields in a field information panel.

4. The method of claim 1, further comprising:
determining another candidate data field from the one or more candidate data fields;
updating the working visualization to include the other candidate data field; and
updating the working data model to include the other candidate data field.

5. The method of claim 1, further comprising:
determining the one or more popular data fields based on the one or more data models, wherein the one or more popular data fields are determined based on one or more metrics associated with the one or more popular data fields, and wherein the one or more popular fields are displayed in the tab panel;
determining a collection of one or more popular visualizations based on the one or more popular data fields, wherein the one or more popular visualizations are displayed in the display panel;
determining a portion of the one or more popular data fields, wherein the portion of the one or more popular data fields are selected by a user; and
modifying the collection of the one or more popular visualizations based on the portion of the one or more popular fields, wherein each popular visualization that is associated with the portion of the one or more popular data fields is included in the collection and each popular visualization that is unassociated with the portion of the one or more popular fields is excluded from the collection.

6. A processor readable non-transitory storage media that includes instructions for managing data visualizations, wherein execution of the instructions by one or more processors, performs actions, comprising:
providing a data source, a model panel, and a display panel, wherein the data source is associated with one or more data models that each include a plurality of data fields; and
in response to a provided search expression, performing further actions, comprising:
determining one or more candidate data fields based on the search expression and the one or more data models, wherein one or more values associated with each candidate data field matches the provided search expression, and wherein the one or more candidate data fields are displayed in the model panel;
generating a working data model based on a portion of the one or more candidate data fields, wherein the portion of the one or more candidate data fields is included in the working data model;
determining one or more portions of one or more visualizations for recommendation based on one or more recommendation models and the working data model, wherein the one or more portions of the one or more visualizations that are recommended include one or more shared data fields that are included in the working data model and one or more recommended visualizations, and wherein the one or more recommended visualizations are rendered as one or more thumbnail images of the one or more recommended visualizations that are listed in the display panel; and
in response to selection of a thumbnail image of a recommended visualization listed in the display panel and selection of one or more data fields of the working data model, generating a working visualization based on the selected thumbnail image of the recommended visualization listed in the display panel and the working data model, wherein the one or more data fields included in the working data model are associated with the working visualization;
in response to updating the working data model to include one or more other candidate data fields, updating one or more of the one or more candidate data fields, the one or more recommended visualizations, or the working visualization based on the updated working data model; and
updating the display of the one or more thumbnail images, in the display panel, to include one or more other thumbnail images rendered for one or more other visualizations based on one or more popular data fields displayed in the tab panel, wherein the one or more popular fields are updated in the tab panel based on each selection of each thumbnail image in the display panel.

7. The media of claim 6, wherein determination of the one or more recommended visualizations, further comprises:
basing the determination on their association with one or more data fields in the working model and another data field that is included in one or more other visualizations, wherein the one or more recommended visualizations are listed in the display panel; and
in response to a selection of one recommended visualization, updating the updated working model to include the other data field.

8. The media of claim 6, further comprising:
determining one or more characteristics associated with the one or more candidate data fields, wherein the one or more characteristics include one or more of a count of a number of visualizations that reference the one or more candidate data fields, data source information associated with the one or more candidate data fields, or a sample of values of the one or more candidate data fields; and
displaying one or more portions of the one or more characteristics for each selection of the one or more candidate data fields in a field information panel.

9. The media of claim 6, further comprising:
determining another candidate data field from the one or more candidate data fields;
updating the working visualization to include the other candidate data field; and
updating the working data model to include the other candidate data field.

10. The media of claim 6, further comprising:
determining the one or more popular data fields based on the one or more data models, wherein the one or more popular data fields are determined based on one or more metrics associated with the one or more popular data fields, and wherein the one or more popular fields are displayed in the tab panel;
determining a collection of one or more popular visualizations based on the one or more popular data fields, wherein the one or more popular visualizations are displayed in the display panel;
determining a portion of the one or more popular data fields, wherein the portion of the one or more popular data fields are selected by a user; and
modifying the collection of the one or more popular visualizations based on the portion of the one or more popular fields, wherein each popular visualization that is associated with the portion of the one or more popular data fields is included in the collection and each popular visualization that is unassociated with the portion of the one or more popular fields is excluded from the collection.

11. A system for managing data visualizations:
a network computer, comprising:
a memory that stores at least instructions; and
one or more processors that execute instructions that perform actions, including:
providing a data source, a model panel, and a display panel, wherein the data source is associated with one or more data models that each include a plurality of data fields; and
in response to a provided search expression, performing further actions, comprising:
determining one or more candidate data fields based on the search expression and the one or more data models, wherein one or more values associated with each candidate data field matches the provided search expression, and wherein the one or more candidate data fields are displayed in the model panel;
generating a working data model based on a portion of the one or more candidate data fields, wherein the portion of the one or more candidate data fields is included in the working data model;
determining one or more portions of one or more visualizations for recommendation based on one or more recommendation models and the working data model, wherein the one or more portions of the one or more visualizations that are recommended include one or more shared data fields that are included in the working data model and one or more recommended visualizations, and wherein the one or more recommended visualizations are rendered as one or more thumbnail images of the one or more recommended visualizations that are listed in the display panel; and
in response to selection of a thumbnail image of a recommended visualization listed in the display panel and selection of one or more data fields of the working data model, generating a working visualization based on the selected thumbnail image of the recommended visualization listed in the display panel and the working data model, wherein the one or more data fields included in the working data model are associated with the working visualization;
in response to updating the working data model to include one or more other candidate data fields, updating one or more of the one or more candidate data fields, the one or more recommended visualizations, or the working visualization based on the updated working data model; and
updating the display of the one or more thumbnail images, in the display panel, to include one or more other thumbnail images rendered for one or more other visualizations based on one or more popular data fields displayed in the tab panel, wherein the one or more popular fields are updated in the tab panel based on each selection of each thumbnail image in the display panel; and a client computer, comprising:
a memory that stores at least instructions; and
one or more processors that execute instructions that perform actions, including:
providing the search expression;
displaying the model panel on a hardware display; and
displaying the display panel on the hardware display.

12. The system of claim 11, wherein the one or more processors of the network computer execute instructions that perform actions, and wherein determination of the one or more recommended visualizations, further comprises:
basing the determination on their association with one or more data fields in the working model and another data field that is included in one or more other visualizations, wherein the one or more recommended visualizations are listed in the display panel; and
in response to a selection of one recommended visualization, updating the updated working model to include the other data field.

13. The system of claim 11, wherein the one or more processors of the network computer execute instructions that perform actions, further comprising:
determining one or more characteristics associated with the one or more candidate data fields, wherein the one or more characteristics include one or more of a count of a number of visualizations that reference the one or more candidate data fields, data source information associated with the one or more candidate data fields, or a sample of values of the one or more candidate data fields; and
displaying one or more portions of the one or more characteristics for each selection of the one or more candidate data fields in a field information panel.

14. The system of claim 11, wherein the one or more processors of the network computer execute instructions that perform actions, further comprising:
determining another candidate data field from the one or more candidate data fields;
updating the working visualization to include the other candidate data field; and
updating the working data model to include the other candidate data field.

15. The system of claim 11, wherein the one or more processors of the network computer execute instructions that perform actions, further comprising:
determining the one or more popular data fields based on the one or more data models, wherein the one or more popular data fields are determined based on one or more metrics associated with the one or more popular data fields, and wherein the one or more popular fields are displayed in the tab panel;
determining a collection of one or more popular visualizations based on the one or more popular data fields, wherein the one or more popular visualizations are displayed in the display panel;
determining a portion of the one or more popular data fields, wherein the portion of the one or more popular data fields are selected by a user; and
modifying the collection of the one or more popular visualizations based on the portion of the one or more popular fields, wherein each popular visualization that is associated with the portion of the one or more popular data fields is included in the collection and each popular visualization that is unassociated with the portion of the one or more popular fields is excluded from the collection.

16. A network computer for managing data visualizations, comprising:
a memory that stores at least instructions; and
one or more processors that execute instructions that perform actions, including:
providing a data source, a model panel, and a display panel, wherein the data source is associated with one or more data models that each include a plurality of data fields; and
in response to a provided search expression, performing further actions, comprising:
determining one or more candidate data fields based on the search expression and the one or more data models, wherein one or more values associated with each candidate data field matches the provided search expression, and wherein the one or more candidate data fields are displayed in the model panel;
generating a working data model based on a portion of the one or more candidate data fields, wherein the portion of the one or more candidate data fields is included in the working data model;
determining one or more portions of one or more visualizations for recommendation based on one or more recommendation models and the working data model, wherein the one or more portions of the one or more visualizations that are recommended include one or more shared data fields that are included in the working data model and one or more recommended visualizations, and wherein the one or more recommended visualizations are rendered as one or more thumbnail images of the one or more recommended visualizations that are listed in the display panel; and
in response to selection of a thumbnail image of a recommended visualization listed in the display panel and selection of one or more data fields of the working data model, generating a working visualization based on the selected thumbnail image of the recommended visualization listed in the display panel and the working data model, wherein the one or more data fields included in the working data model are associated with the working visualization;
in response to updating the working data model to include one or more other candidate data fields, updating one or more of the one or more candidate data fields, the one or more recommended visualizations, or the working visualization based on the updated working data model; and
updating the display of the one or more thumbnail images, in the display panel, to include one or more other thumbnail images rendered for one or more other visualizations based on one or more popular data fields displayed in the tab panel, wherein the one or more popular fields are updated in the tab panel based on each selection of each thumbnail image in the display panel.

17. The network computer of claim 16, wherein the one or more processors execute instructions that perform further actions, and wherein determination of the one or more recommended visualizations, further comprises:
basing the determination on their association with one or more data fields in the working model and another data field that is included in one or more other visualizations, wherein the one or more recommended visualizations are listed in the display panel; and
in response to a selection of one recommended visualization, updating the updated working model to include the other data field.

18. The network computer of claim 16, wherein the one or more processors execute instructions that perform actions, further comprising:
determining one or more characteristics associated with the one or more candidate data fields, wherein the one or more characteristics include one or more of a count of a number of visualizations that reference the one or more candidate data fields, data source information associated with the one or more candidate data fields, or a sample of values of the one or more candidate data fields; and
displaying one or more portions of the one or more characteristics for each selection of the one or more candidate data fields in a field information panel.

19. The network computer of claim 16, wherein the one or more processors execute instructions that perform actions, further comprising:
determining another candidate data field from the one or more candidate data fields;
updating the working visualization to include the other candidate data field; and
updating the working data model to include the other candidate data field.

20. The network computer of claim 16, wherein the one or more processors execute instructions that perform actions, further comprising:
determining the one or more popular data fields based on the one or more data models, wherein the one or more popular data fields are determined based on one or more metrics associated with the one or more popular data fields, and wherein the one or more popular fields are displayed in the tab panel;
determining a collection of one or more popular visualizations based on the one or more popular data fields, wherein the one or more popular visualizations are displayed in the display panel;
determining a portion of the one or more popular data fields, wherein the portion of the one or more popular data fields are selected by a user; and
modifying the collection of the one or more popular visualizations based on the portion of the one or more popular fields, wherein each popular visualization that is associated with the portion of the one or more popular data fields is included in the collection and each popular visualization that is unassociated with the portion of the one or more popular fields is excluded from the collection.

* * * * *